United States Patent
Okimura et al.

(10) Patent No.: US 9,121,468 B2
(45) Date of Patent: Sep. 1, 2015

(54) ROTARY DAMPER

(75) Inventors: Akihiko Okimura, Fujisawa (JP);
Naohiro Horita, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 2 days.

(21) Appl. No.: 13/979,640

(22) PCT Filed: Nov. 17, 2011

(86) PCT No.: PCT/JP2011/076538
§ 371 (c)(1),
(2), (4) Date: Jul. 26, 2013

(87) PCT Pub. No.: WO2012/132097
PCT Pub. Date: Oct. 4, 2012

(65) Prior Publication Data
US 2014/0020994 A1 Jan. 23, 2014

(30) Foreign Application Priority Data
Mar. 31, 2011 (JP) .................... 2011-079714

(51) Int. Cl.
| F16D 57/00 | (2006.01) |
| F16F 9/14 | (2006.01) |
| B60N 2/22 | (2006.01) |
| B60N 2/44 | (2006.01) |

(52) U.S. Cl.
CPC . *F16F 9/145* (2013.01); *B60N 2/22* (2013.01); *B60N 2/2227* (2013.01); *B60N 2/444* (2013.01)

(58) Field of Classification Search
CPC ........ F16F 9/145; B60N 2/444; B60N 2/2227
USPC ........ 188/306, 307, 308, 309, 310; 137/512.2
See application file for complete search history.

(56) References Cited

U.S. PATENT DOCUMENTS

| 1,628,811 | A | * | 5/1927 | Shultz et al. | 188/286 |
| 1,920,218 | A | * | 8/1933 | Shultz | 188/309 |
| 1,926,800 | A | * | 9/1933 | Casper | 188/308 |
| 1,932,770 | A | * | 10/1933 | Crowe | 188/310 |
| 1,966,005 | A | * | 7/1934 | Fieldman | 188/310 |
| 2,038,588 | A | * | 4/1936 | Mitchell | 188/309 |
| 2,060,554 | A | * | 11/1936 | Chryst | 188/310 |
| 2,100,407 | A | * | 11/1937 | Peo et al. | 188/322.13 |

(Continued)

FOREIGN PATENT DOCUMENTS

| DE | 589881 C | 12/1933 |
| EP | 1710464 A1 | 10/2006 |
| FR | 1530147 A | 6/1968 |
| JP | S42-4848 B1 | 2/1967 |

(Continued)

*Primary Examiner* — Bradley King
(74) *Attorney, Agent, or Firm* — patenttm.us

(57) ABSTRACT

The rotary damper comprises: case having viscous fluid 13 filled cylindrical chamber; rotor housed in the chamber; check valve; and pressure-regulating valve. In the chamber, projecting bulkheads are formed. The rotor comprises: the rotor body and vanes. The check valve closes when the rotor rotates in the normal rotation direction, so as to restrict movement of the viscous fluid between areas 111*a*-111*d* partitioned by the bulkheads and the vanes. On the other hand, the check valve opens when the rotor rotates in the reverse rotation direction, so as to allow movement of the viscous fluid between the areas 111*a*-111*d*. The pressure-regulating valve opens when rotating force applied for rotating the rotor in the normal rotation direction is above a predetermined value, to cancel the restriction of movement of the viscous fluid between the areas 111*a*-111*d*.

2 Claims, 24 Drawing Sheets

(56) References Cited

U.S. PATENT DOCUMENTS

| | | | | |
|---|---|---|---|---|
| 2,194,001 | A | * | 3/1940 | Begg .............................. 188/306 |
| 2,194,002 | A | * | 3/1940 | Begg .............................. 188/309 |
| 3,237,728 | A | | 3/1966 | Rumsey |
| 4,068,680 | A | * | 1/1978 | Sliger ........................ 137/512.1 |
| 4,411,341 | A | * | 10/1983 | Schultz ........................ 188/310 |
| 4,716,996 | A | * | 1/1988 | Hummel ...................... 188/306 |

FOREIGN PATENT DOCUMENTS

| | | |
|---|---|---|
| JP | H07-301272 A | 11/1995 |
| JP | H08-303512 A | 11/1996 |
| JP | 2003-056620 A | 2/2003 |
| JP | 2005-188634 A | 7/2005 |
| WO | 84/03131 A1 | 8/1984 |
| WO | 2006092891 A1 | 9/2006 |

\* cited by examiner

Fig. 1
(A)
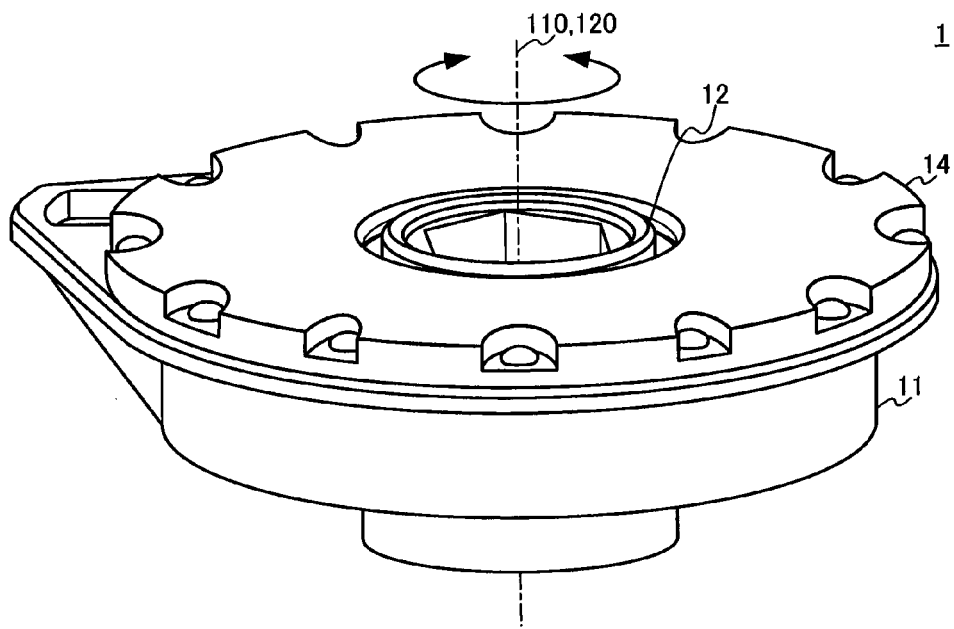
(B)
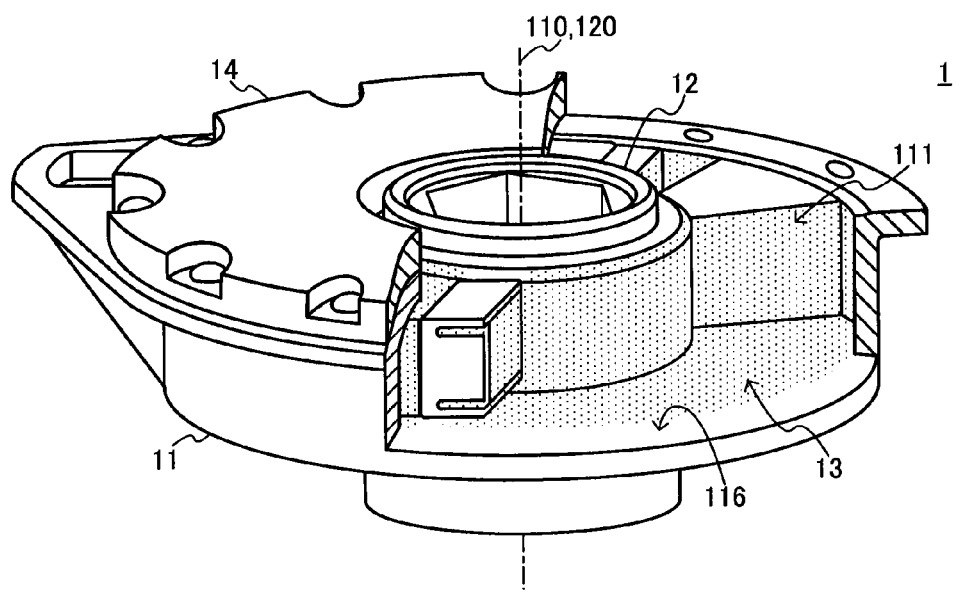

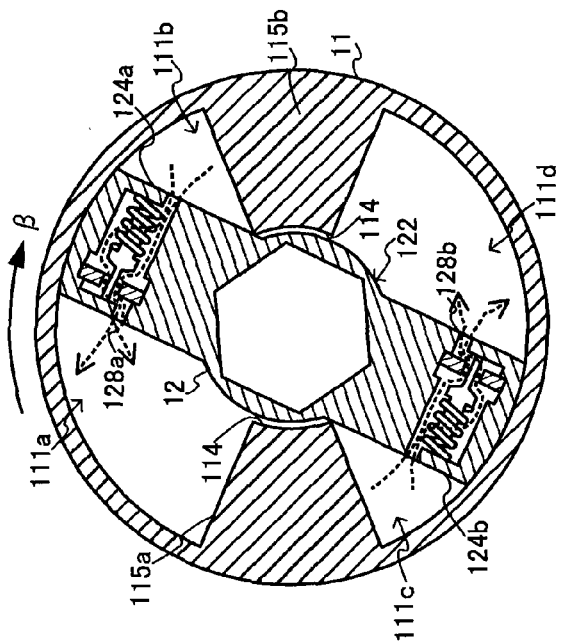
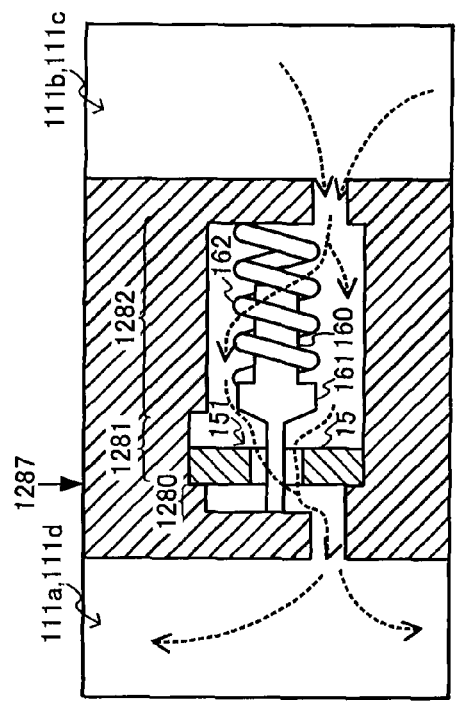
Fig. 8

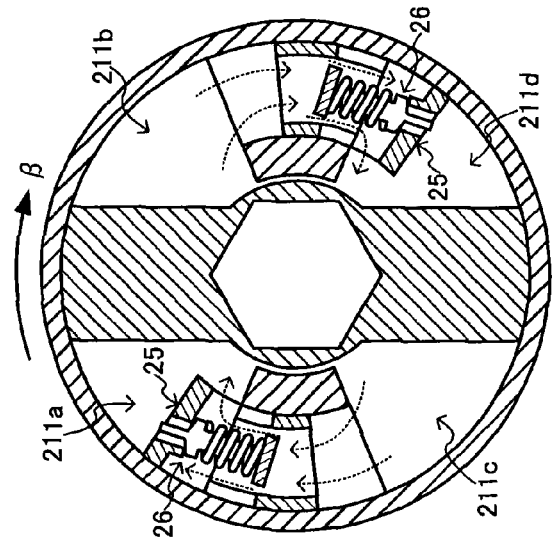
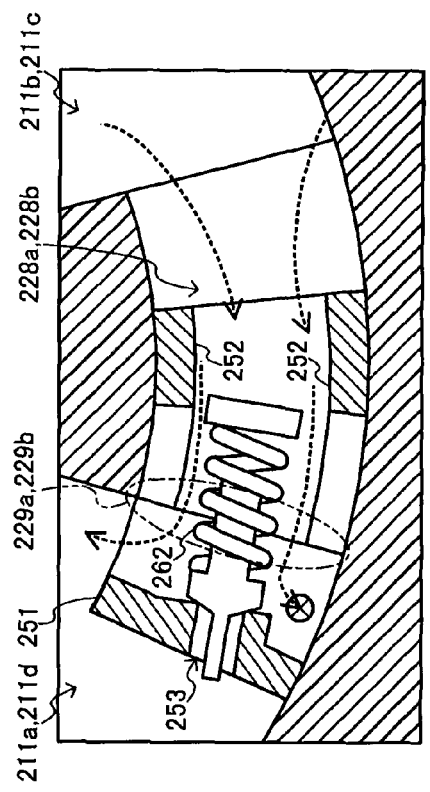
Fig. 14

Fig. 18
(A)
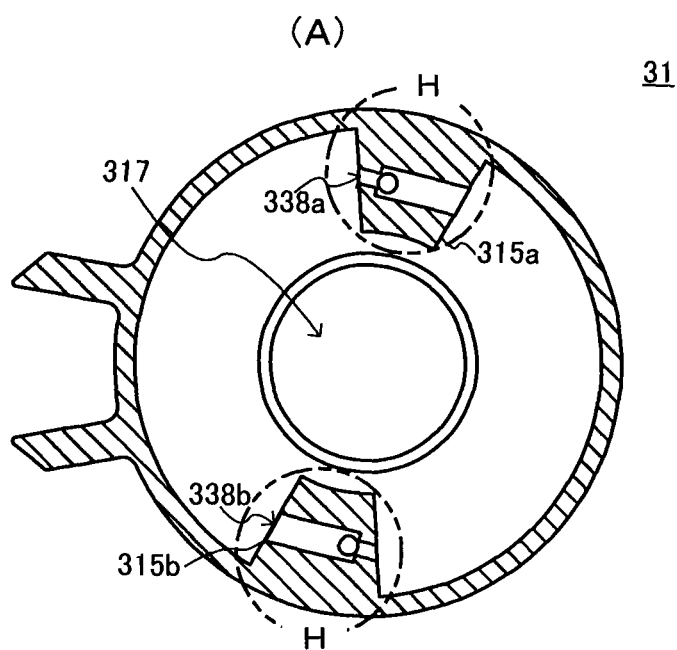
(B)
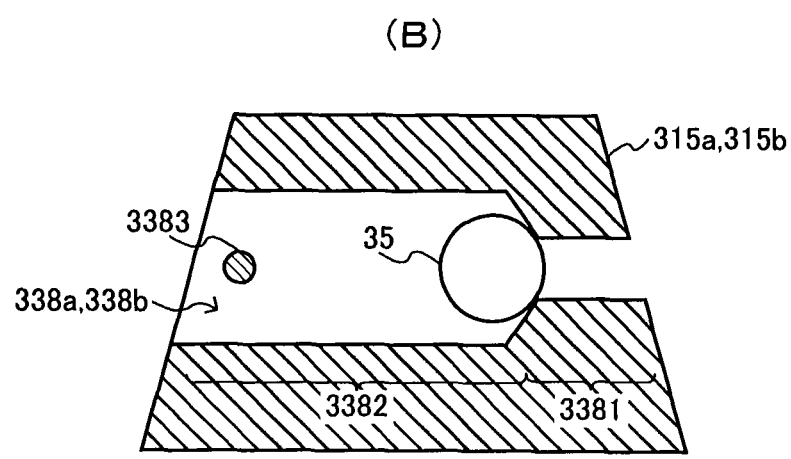

Fig. 24
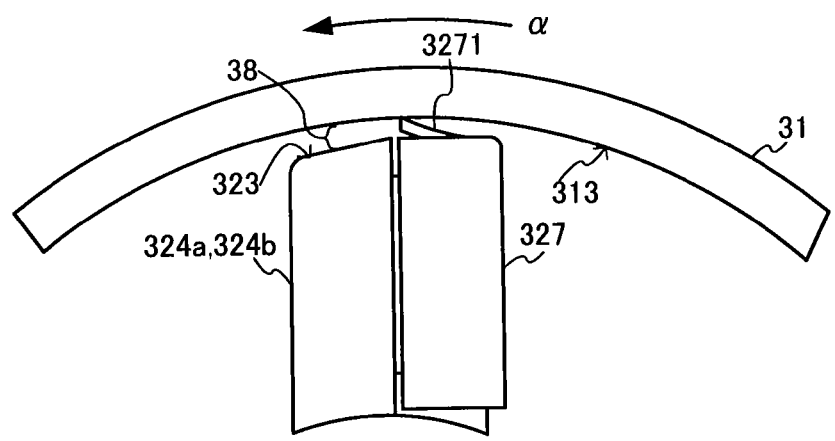
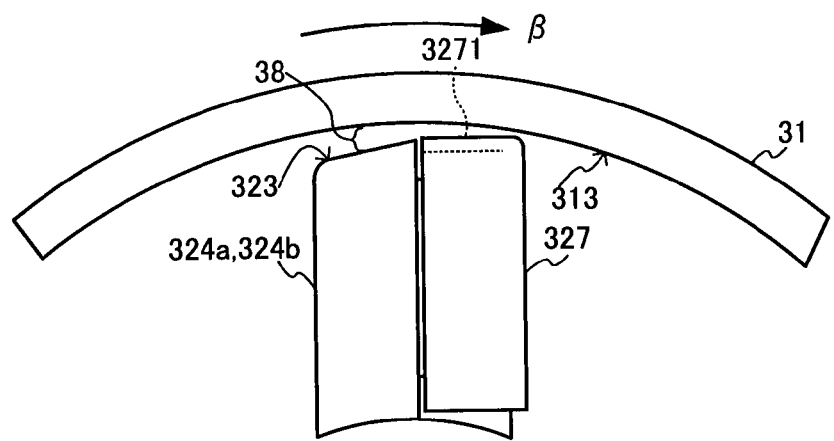

ROTARY DAMPER

TECHNICAL FIELD

The present invention relates to a rotary damper, and particularly to structure that is suitable for a unidirectional rotary damper.

BACKGROUND ART

There exists a rotary damper known as a so-called unidirectional rotary damper, which generates strong damping torque for rotation in the normal rotation direction while it generates weak damping torque for rotation in the reverse rotation direction. For example, the below-mentioned Patent Document 1 discloses a unidirectional rotary damper, which is simple in structure and can be produced at low cost.

The rotary damper described in the Patent Document 1 comprises: a case having a cylindrical chamber; a rotor (i.e. rotating body) having a rotor body of a cylindrical shape and vanes, the rotor being housed in the cylindrical chamber such that its rotation axis coincides with the center line of the cylindrical chamber, to allow rotation of the rotor; viscous fluid filling the cylindrical chamber; and a lid for enclosing the rotor and the viscous fluid in the cylindrical chamber. In the inner wall surface of the cylindrical chamber, there are formed bulkheads, which are projecting toward the center line so as to form a narrow gap between each bulkhead and the outer periphery of the rotor body. Each vane protruding from the outer periphery of the rotor body toward the inner periphery side of the cylindrical chamber is formed, so as to form a narrow gap between the vane and the inner periphery of the cylindrical chamber. In each vane, there is formed a flow path from one side surface (referred to as first side surface) perpendicular to the direction of rotation of the rotor to the other side surface (referred to as second side surface). Further, an apical surface (a surface opposite to the inner wall surface of the cylindrical chamber) of each vane is attached with a seal member to close the gap between the apical surface and the inner wall surface of the cylindrical chamber. Each seal member has a check valve of an elastic body, which opens and closes the flow path from the side of the second side surface with respect to the direction of rotation of the vane.

The rotary damper described in the Patent Document 1, in the above configuration, blocks the flow paths by check valves pressed against the second side surfaces of the vanes because of the viscous fluid in the cylindrical chamber, when force for rotating in the direction from the first side surfaces of the vanes toward the second side surfaces of the vanes (i.e. in the normal rotation direction) is applied to the rotor. As a result, the movement of the viscous fluid is limited to movement through the narrow gap between each bulkhead of the cylindrical chamber and the outer periphery of the rotor body. Thus the pressure on the viscous fluid at the sides of the second side surfaces of the vanes increases, whereby strong damping torque is generated. On the other hand, when force for rotating in the direction from the second side surfaces of the vanes toward the first side surfaces of the vanes (i.e. in the reverse rotation direction) is applied to the rotor, the viscous fluid on the sides of the first side surfaces flows into the flow paths and pushes up the check valves to open the flow paths. As a result, the movement of the viscous fluid occurs also in the flow paths. Thus, the pressure on the viscous fluid on the sides of the first side surfaces of the vanes is not increased, and thus weak damping torque is generated.

CITATION LIST

Patent Literature

PTL 1: Japanese Un-examined Patent Application Laid-Open No. H7-301272

SUMMARY OF INVENTION

Technical Problem

However, the rotary damper described in the Patent Document 1 can be damaged when pressure of the viscous fluid on the sides of the second side surface of the vanes increases above the assumed value because of force being applied to the rotor rotating in the normal rotation direction above the assumed rotating speed.

The present invention has been made considering the above circumstances. And an object of the present invention is to provide a technique that can reduce the possibility of breakage of a rotary damper even if rotating force above the assumed value is applied to the rotary damper.

Solution to Problem

To solve the above problem, the present invention provides a rotary damper for generating damping torque against applied rotating force by restricting movement of filled viscous fluid, comprising a means for canceling the restriction of movement when the rotating force is larger than a predetermined value.

For example, the present invention provides a rotary damper for generating damping torque against applied rotating force by restricting movement of filled viscous fluid, comprising a pressure-regulating valve which opens for canceling the restriction of movement of the viscous fluid, when the rotating force is more than or equal to a predetermined value.

Here, it is possible that:
the rotary damper further comprises:
a case having a cylindrical chamber filled with the viscous fluid;
a rotor housed in the cylindrical chamber so as to be rotatable on a center line of the cylindrical chamber relatively to the case; and
a check valve which opens and closes depending on a direction of rotation of the rotor; wherein:
on a sidewall surface of the cylindrical chamber, there is formed a projecting bulkhead along the center line such that an apical surface of the bulkhead is close to an outer periphery of the rotor;
on the outer periphery of the rotor, there is formed a vane whose apical surface is close to a side surface of the cylindrical chamber;
the check valve closes for relative rotation of the rotor to the case in a normal rotation direction, to restrict movement of the viscous fluid between areas partitioned by the bulkhead and the vane, while the check valve opens for relative rotation of the rotor to the case in a reverse rotation direction, to allow movement of the viscous fluid between the areas partitioned by the bulkhead and the vane; and
the pressure-regulating valve opens to cancel the restriction of movement of the viscous fluid between the areas partitioned by the bulkhead and the vane, when the rotating force, which is applied for rotating the rotor in the normal rotation direction relatively to the case, is above the predetermined value.

Advantageous Effects of Invention

According to the present invention, even if rotating force larger than an assumption is applied, it is possible to suppress the pressure less than the predetermined value on the viscous fluid filling the cylindrical chamber, so that the possibility of damage of the rotary damper can be reduced.

BRIEF DESCRIPTION OF DRAWINGS

FIGS. 1(A) and 1(B) are an external view and a partial cross-section showing a schematic construction of the rotary damper 1 of the first embodiment of the present invention;

FIG. 8 is a view for explaining the operating principle of the rotary damper 1;

FIG. 14 is a view for explaining the operating principle of the rotary damper 2;

FIG. 18(A) is a G-G cross-section of the case 31 shown in FIG. 17(A), and FIG. 18(B) an enlarged view of the portion H of FIG. 18(A);

FIGS. 24(A) and 24(B) are views for explaining the operating principle in the case where the check-valve function is given to the lip seal 327.

DESCRIPTION OF EMBODIMENTS

Figure 2:
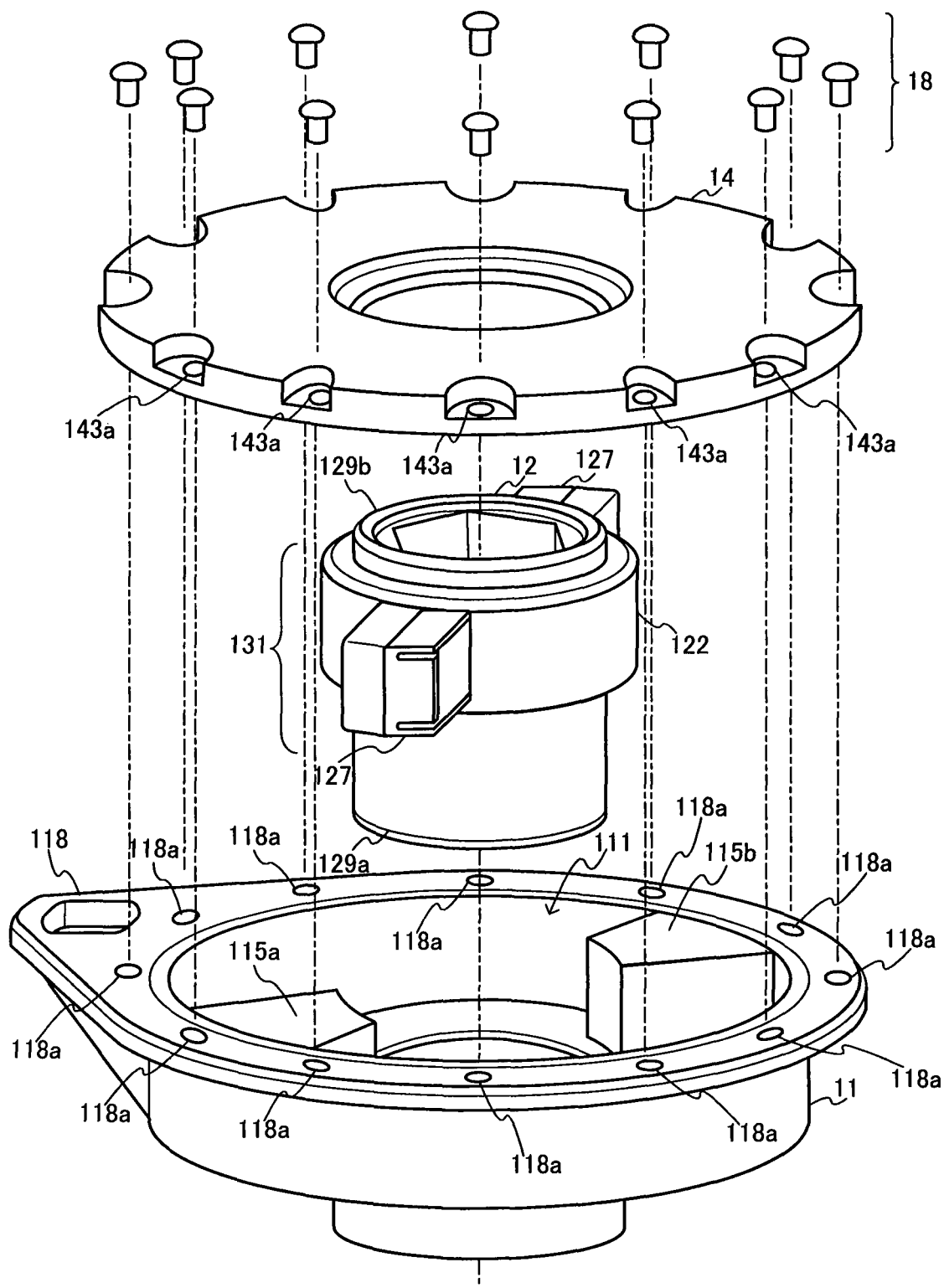
FIG. 2 is an exploded view of the rotary damper 1 of the first embodiment of the present invention.

In the following, embodiments of the present invention will be described referring to the drawings.

[First Embodiment]

FIGS. 1(A) and 1(B) are an external view and a partial cross-section showing a schematic construction of the rotary damper 1 of the first embodiment of the present invention. And FIG. 2 is an exploded view of the rotary damper 1.

As shown in the figures, the rotary damper 1 of the present embodiment comprises: the case 11; the rotor (rotating body) 12 housed in the case 11 so as to be rotatable relatively to the case 11; the viscous fluid (such as oil, silicone or the like) 13 filling the case 11; the lid 14 for enclosing the rotor 12 together with the viscous fluid 13 in the case 11; and a plurality of the screws 18 for fixing the lid 14 to the case 11. Although not shown in FIG. 1 and FIG. 2, the rotary damper 1 further comprises the check valves 15 and the pressure-regulating valves 16.

Figure 3:
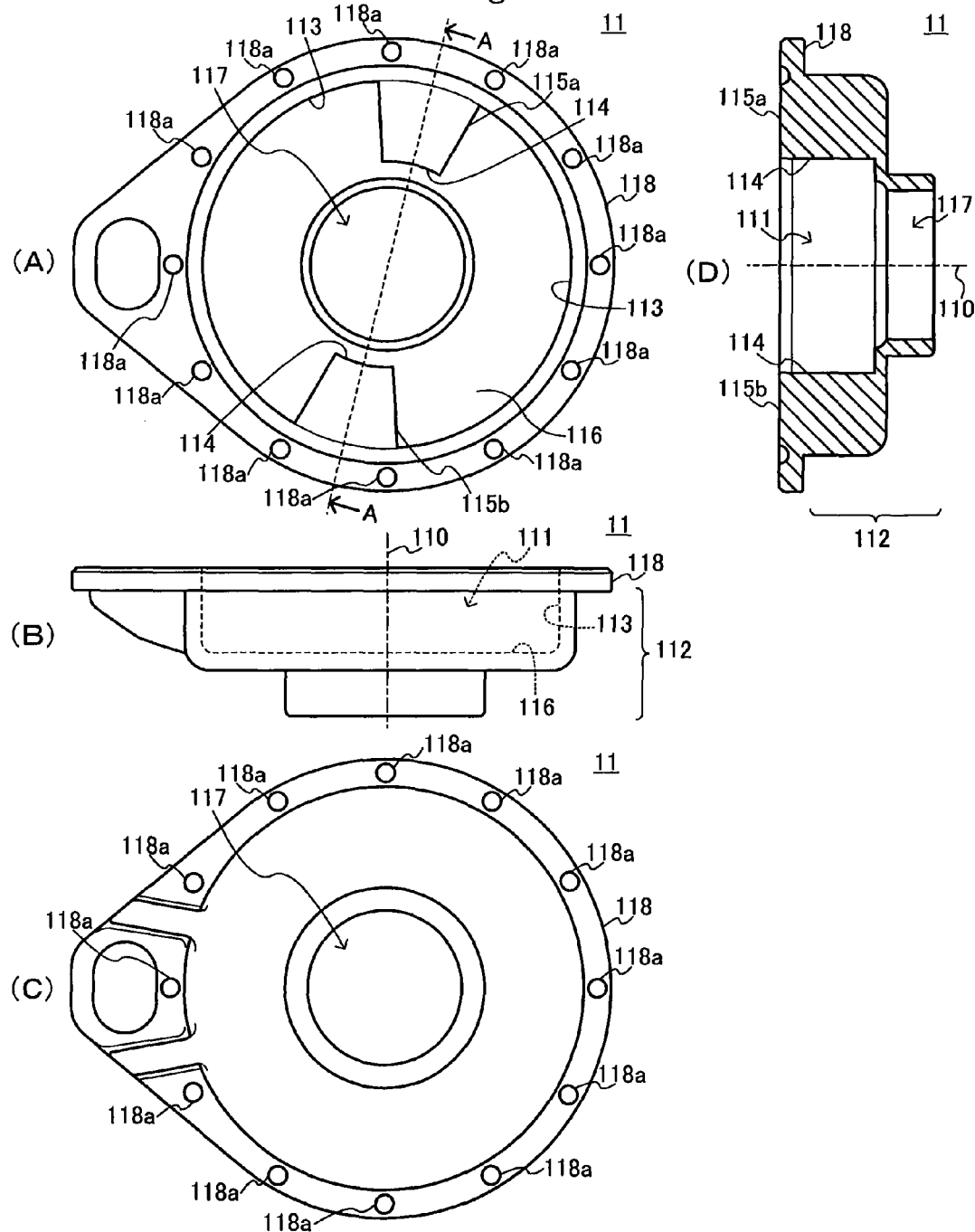
FIGS. 3(A)-3(C) are a top view, a front elevation and a bottom view of the case 11.
FIG. 3(D) is an A-A cross-section of the case 11 shown in FIG. 3(A)

FIGS. 3(A)-3(C) are a top view, a front elevation and a bottom view of the case 11. And FIG. 3(D) is an A-A cross-section of the case 11 shown in FIG. 3(A).

As shown in the figures, the case 11 comprises: the case body 112; and the flange portion 118 formed on the outer periphery of the edge portion of the case body 112.

Figure 7:
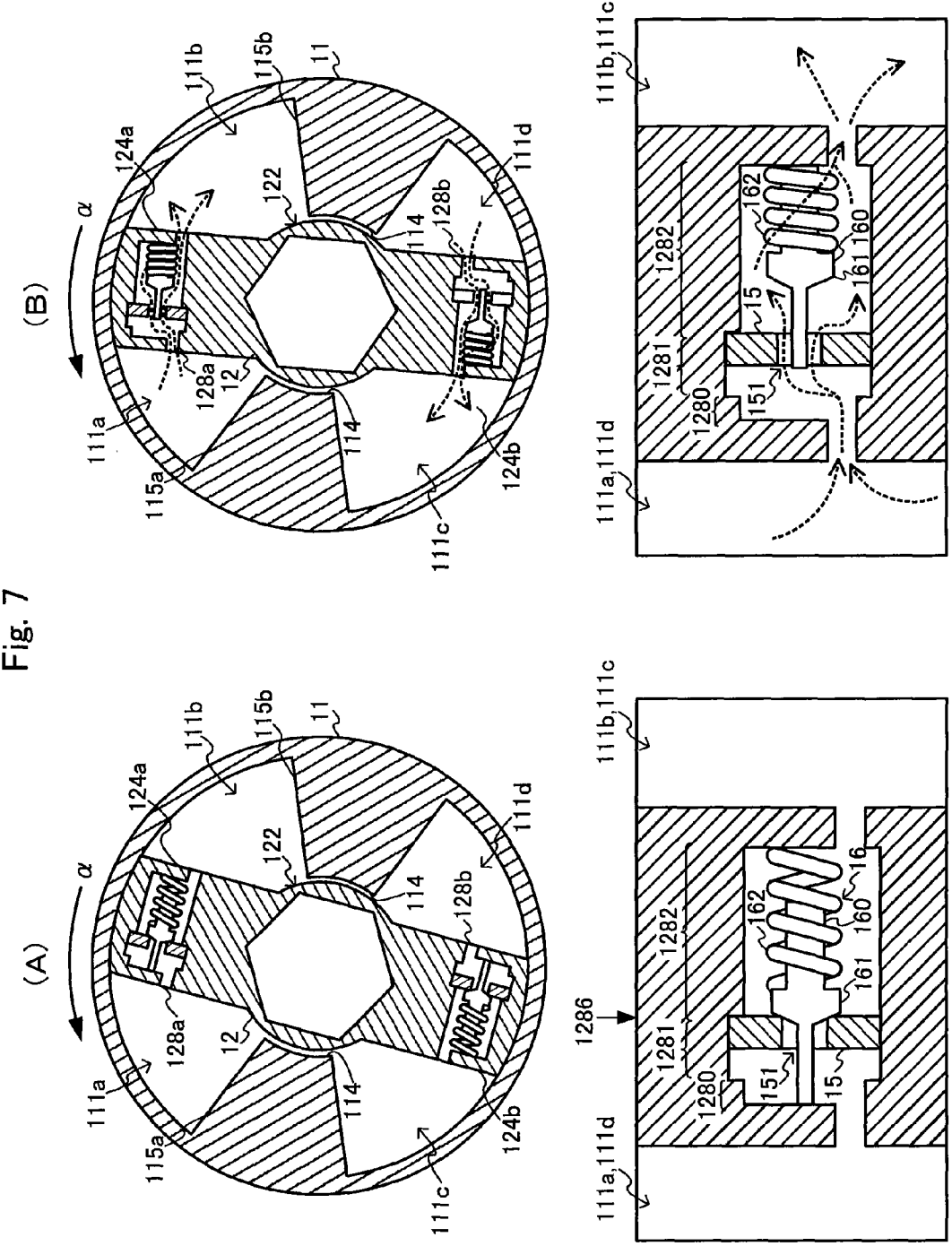
FIGS. 7(A) and 7(B) are views for explaining the operating principle of the rotary damper 1.

In the case body 112, the cylindrical chamber (i.e. the cylindrical shape space having the bottom) 111 is formed. The rotor 12 has the rotor body 131 of the cylindrical shape and the vanes 124a, 124b formed on the outer periphery 122 of the rotor body 131. The rotor 12 is housed in the cylindrical chamber 111 such that the rotor 12 can rotate on the center line 110 of the cylindrical chamber 111 (i.e. such that the center line 110 of the cylindrical chamber 111 coincides with the rotation axis 120 of the rotor 12). On the inner periphery 113 of the case body 112 (i.e. the sidewall surface 113 of the cylindrical chamber 111), the pair of projecting bulkheads 115a, 115b are formed along the center line 110 of the cylindrical chamber 111. The pair of bulkheads 115a, 115b protrude toward the outer periphery 122 of the rotor body 131 (i.e. the apical surfaces 114 of the projecting bulkheads 115a, 115b are close to the outer periphery 122 of the rotor 12), so as to partition in radial directions the ring-shaped space between the outer periphery 122 of the rotor body 131 and the sidewall surface 113 of the cylindrical chamber 111. The viscous fluid 13 fills the areas (the areas 111a-111d in FIG. 7) partitioned by these bulkheads 115a, 115b between the outer periphery 122 of the rotor body 131 and the sidewall surface 113 of the cylindrical chamber 111. Further, in the bottom surface 116 of the cylindrical chamber 111, the opening 117 for inserting the one end portion (the lower end portion) 129a of the rotor body 131 is formed.

In the flange portion 118, the plurality of threaded holes 118a are formed. And, the screws 18 are inserted through through-holes 143a of the lid 14 placed on the flange portion 118, and fastened into these threaded holes 118a.

Figure 4:
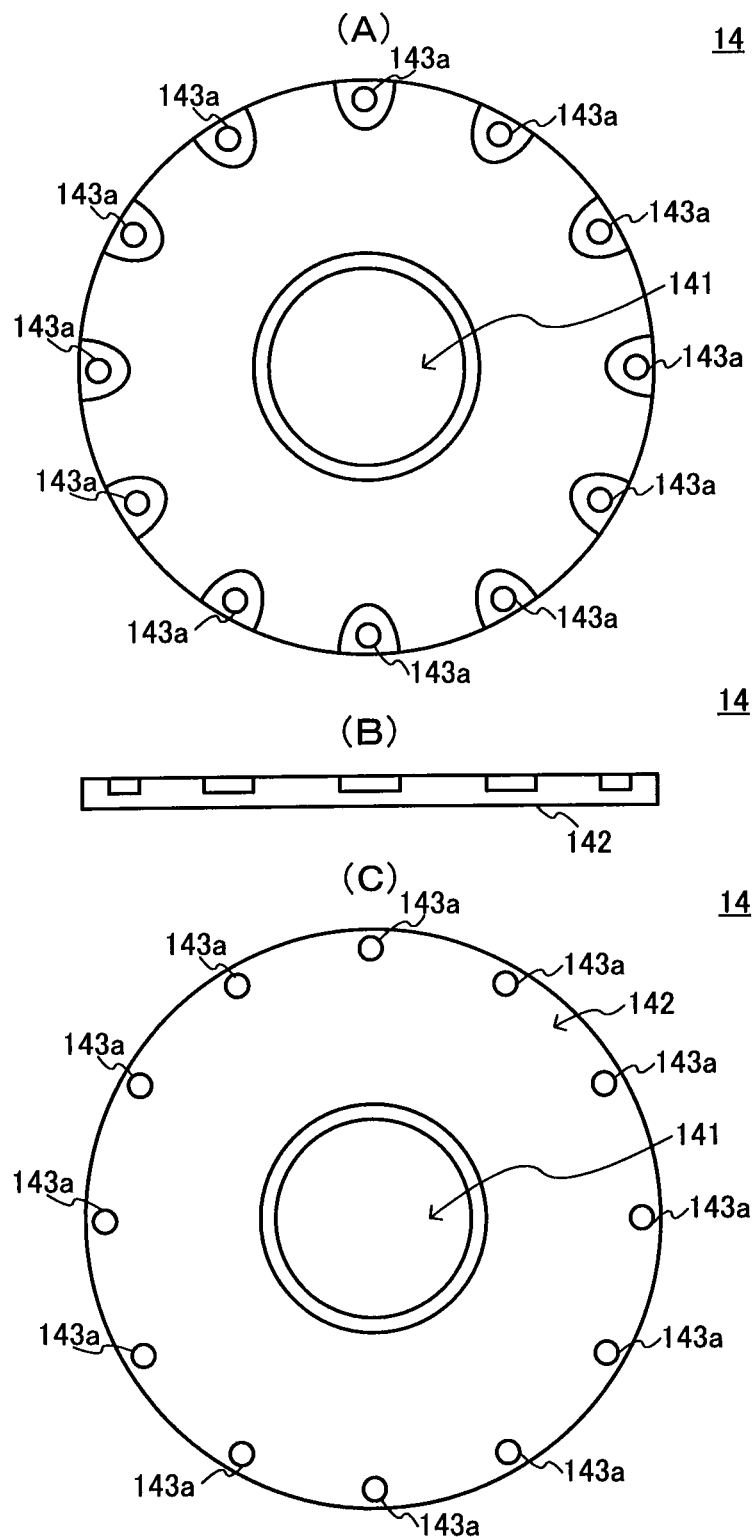
FIGS. 4(A)-4(C) are a top view, a front elevation and a bottom view of the lid 14.

FIGS. 4(A)-4(C) are a top view, a front elevation and a bottom view of the lid 14.

As shown in the figures, in the lid 14, the opening 141 for inserting the other end portion (the upper end portion 129b) of the rotor body 131 is formed at a corresponding position of the opening 117 of the bottom surface 116. Further, in the flange portion 118 of the case 11, the through-holes 143a for inserting the screws 18 fastened into the threaded holes 118a are formed at corresponding positions of the threaded holes 118a. Also, a seal member such as an O-ring may be interposed between the lid 14 and the case 11 to increase the sealing performance, so that the viscous fluid 13 will not leak out of the cylindrical chamber 111.

FIGS. 5(A)-5(D) are a top view, a front elevation, a side elevation and a bottom view of the rotor 12.

As shown in the figures, in the rotor body 131, the through-hole 121 centering on the rotation axis 120 is formed. The through-hole 121 is for inserting a shaft (not shown) which transmits rotating force from the outside to the rotor 12. The lower end portion 129a of the rotor body 131 (the through-hole 121) is slidably inserted into the opening 117 formed in the bottom surface 116 of the cylindrical chamber 111 of the case 11. And the upper end portion 129b of the rotor body 131 (the through-hole 121) is slidably inserted into the opening 141 of the lid 14. Also, seal members such as O-rings may be interposed between the end portions 129a, 129b of the rotor body 131 and the openings 117,141 to increase the sealing performance, so that the viscous fluid 13 will not leak out of the cylindrical chamber 111.

On the outer periphery 122 of the rotor body 131, the pair of vanes (rotating wings) 124a, 124b are formed along the sidewall surface 113 of the cylindrical chamber 111. The pair of vanes 124a, 124b protrude toward the sidewall surface 113 of the cylindrical chamber 111 so that the apical surfaces (i.e. the surfaces corresponding to the sidewall surface 113 of the cylindrical chamber 111) 123 of the vanes 124a, 124b are close to the sidewall surface 113 of the cylindrical chamber 111. To each vane 124a, 124b, the lip seal 127 (See FIG. 2) is attached. The lip seal 127 fills gaps formed between the apical surface 123 of the vane 124a, 124b and the sidewall surface 113 of the cylindrical chamber 111, gaps formed between the lower surface (the surface corresponding to the bottom surface 116 of the cylindrical chamber 111) 125 of the vane 124a, 124b and the bottom surface 116 of the cylindrical chamber 111, and gaps formed between the upper surface (the surface on the side of the lid 14) 126 of the vane 124a, 124b and the lower surface (the surface on the side of the case 11) 142 of the lid 14.

Figure 5:
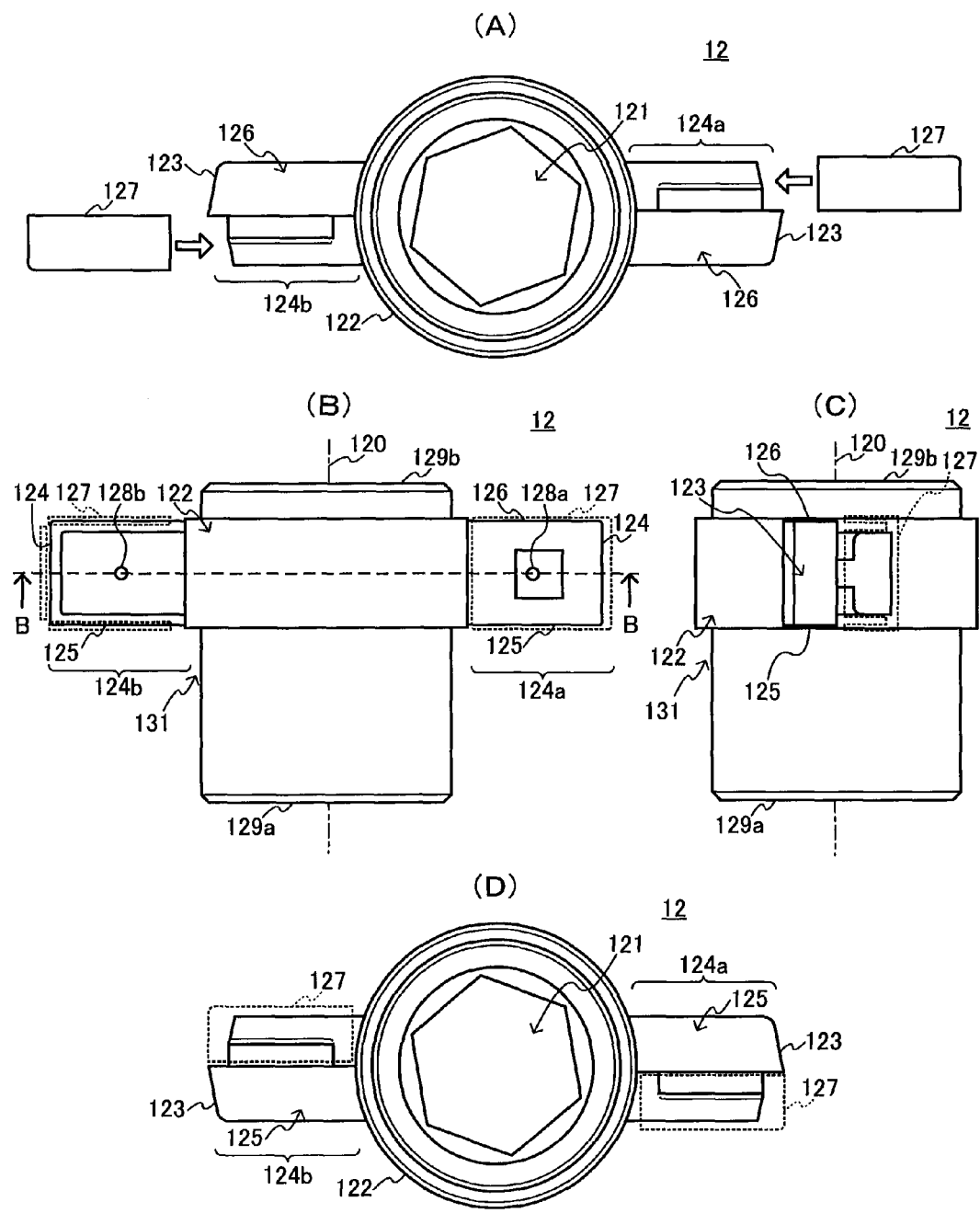
FIGS. 5(A)-5(D) are a top view, a front elevation, a side elevation and a bottom view of the rotor 12.
Figure 6:
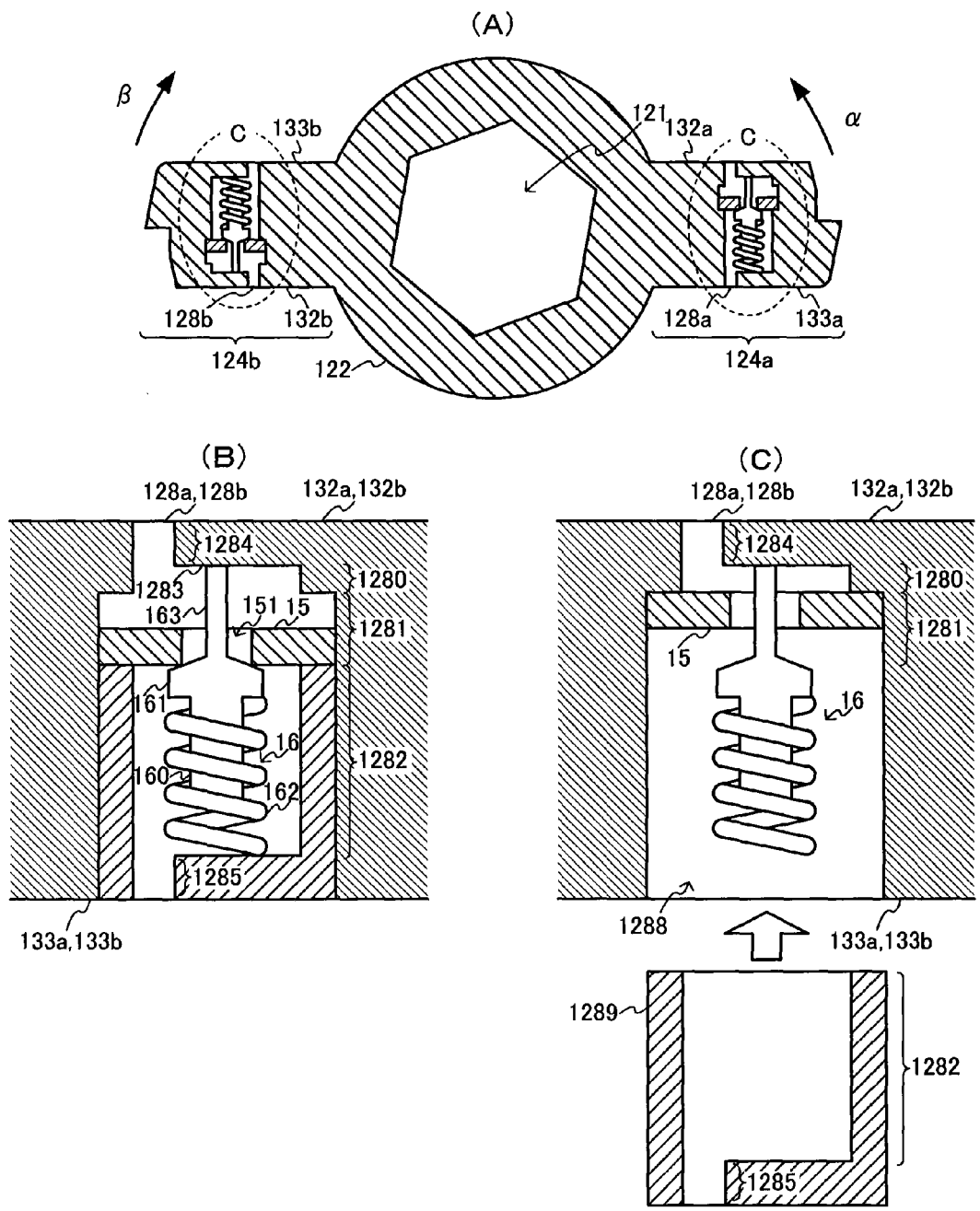
FIG. 6(A) is a B-B cross-section of the rotor 12 shown in FIG. 5(B)
FIG. 6(B) is an enlarged view of the portion C of FIG. 6(A)
FIG. 6(C) is a view for explaining a method of preparing the flow paths 128a, 128b.

FIG. 6(A) is a B-B cross-section of the rotor 12 shown in FIG. 5(B). And FIG. 6(B) is an enlarged view of the portion C of FIG. 5(A).

As shown in the figures, in the vane 124a, the flow path (an orifice) 128a is formed to pass through the one side surface 132a and the other side surface 133b of this vane 124a. The flow path 128a connects the area 111a (See FIG. 7) and the area 111b (See FIG. 7) of the cylindrical chamber 111. The area 111a is partitioned by this vane 124a and the bulkhead 115a of the cylindrical chamber 111. The area 111b (See FIG. 7) is partitioned by this vane 124a and the bulkhead 115b of the cylindrical chamber 111. Similarly, in the vane 124b, the flow path 128b is formed to pass through one side surface 132b and the other side surface 133b of this vane 124b. The pass through connects the area 111c (See FIG. 7) and the area 111d (See FIG. 7) of the cylindrical chamber 111. The area 111c is partitioned by the vane 124b and the bulkhead 115a of the cylindrical chamber 111. The area 111d is partitioned by the vane 124b and the bulkhead 115b of the cylindrical chamber 111.

Each of the flow paths 128a, 128b is provided in its inside with the check valve 15 and the pressure-regulating valve 16 as a pair.

Inside each flow path 128a, 128b, three adjacent sections 1280-1282 are formed between the flow path opening 1284 and the flow path opening 1285 such that the axes of these sections are shifted from the axis of the flow path openings 1284, 1285. The flow path opening 1284 is formed in the one side surface 132a, 132b of the vane 124a, 124b. And the flow path opening 1285 is formed in the other side surface 133a, 133b of the vane 124a, 124b. Each of these three sections has a flow path cross-section sizes in the radial direction larger than that of the flow path openings 1284, 1285. In detail, the first flow path section 1280, the second flow path section 1281 whose flow path cross-section size in the radial direction is larger than that of the first flow path section 1280. And the third flow path section 1282 whose flow path cross-section size in the radial direction is smaller than that of the second flow path section 1281.

The second flow path section 1281 houses the check valve 15 slidably in the flow direction of the viscous fluid 13. And the third flow path section 1282 houses the pressure-regulating valve 16. The second flow path section 1281 is formed so as to adjoin the side of the area 111a, 111d (See FIG. 7) to the third flow path section 1282, wherein the filled viscous fluid 13 in the area 111a, 111d is pressurized when the rotor 12 is rotated in the normal rotation direction (the direction α in the present embodiment).

The check valve 15 is a plate-like member placed inside the second flow path section 1281 so as to open and close the second flow path section 1281, and slides within the second flow path section 1281 in directions that depend on the rotation direction of the rotor 12. Further, in the check valve 15, the through-hole 151 through which the viscous fluid 13 passes is formed. This through-hole 151 is opened and closed by the pressure-regulating valve 16.

The pressure-regulating valve 16 comprises: the needle 160 for regulating the flow rate of the viscous fluid 13 passing through the through-hole 151 of the check valve 15; and the elastic body 162 such as a spring, which biases the needle 160 toward the second flow path section 1281. The needle 160 comprises: the tapered plug portion 161 for blocking the through-hole 151 of the check valve 15; and the rod-like stopper 163 provided at the end portion of the plug portion 161 on the side of the check valve 15. The needle 160 is inserted in the through-hole 151 of the check valve 15 from the side of the third flow path section 1282 so that the stopper 163 protrudes toward the second flow path section 1281. When the check valve 15 moves toward the third flow path section 1282, the plug portion 161 is inserted in the through-hole 151 of the check valve 15. As a result, the through-hole 151 of the check valve 15 is blocked by the plug portion 161. Further, when the needle 160 moves toward the first and second flow path sections 1280, 1281 by being biased by the elastic body 162, the stopper 163 abuts against the inner wall 1283 of the flow path 128a, 128b via the through-hole 151 of the check valve 15. As a result, the movement of the plug portion 161 toward the first and second flow path sections 1280 and 1281 is limited.

For example, as shown in FIG. 6(C), the flow path 128a, 128b as described above can be prepared by: previously forming the through-hole 1288 in the vane 124a, 124b, as a part (i.e. the flow path opening 1284 on one side and the first and second flow path sections 1280 and 1281) of the flow path 128a, 128b; inserting the check valve 15 and the pressure-regulating valve 16 in this order into the through-hole 1288; and then fitting the block 1289 in the through-hole 1288, wherein a part (i.e. the other flow path opening 1285 and the third flow path section 1282) of the flow path 128a, 128b is formed in the block 1289.

Here, to realize smooth movement of the needle 160, it is possible to provide guides (for example, three or more protrusions formed on the end surface portion of the through-hole 151 on the side of the first flow path section 1280) for preventing play of the stopper 163 in the radial direction of the through-hole 151 of the check valve 15.

Next, the operating principle of the rotary damper 1 will be described. FIGS. 7(A) and 7(B) and FIG. 8 are views for explaining the operating principle of the rotary damper 1.

As shown in FIGS. 7(A) and 7(B), when the rotor 12 rotates in the normal rotation direction (the direction α in the present embodiment) relatively to the case 11, the check valve 15 slides in the second flow path 1281 up to the boundary 1286 between the second flow path section 1281 and the third flow path section 1282.

Here, as shown in FIG. 7(A), when rotating force (rotating speed in the direction α) applied to the rotor 12 or the case 11 is less than a predetermined value determined by the elastic coefficient of the elastic body 162 of the pressure-regulating valve 16, the plug portion 161 of the needle 160 pressed by the elastic body 162 remains pushed in the through-hole 151 of the check valve 15. And thereby the flow path 128a, 128b is closed. As a result, in the cylindrical chamber 111, the movement of the viscous fluid 13 between the areas 111a-111d partitioned by the bulkheads 115a, 115b and the vanes 124a, 124b of the rotor 12 is limited to movement through gaps etc. between the apical surfaces 114 of the bulkheads 115a, 115b and the outer periphery 122 of the rotor 12. Accordingly, the pressures of the viscous fluid 13 in the areas 111a, 111d are increased. And thereby strong damping torque is generated.

As shown in FIG. 7(B), when the rotating force applied to the rotor 12 or the case 11 is above the above-mentioned predetermined value, the needle 160 is pushed back toward the third flow path section 1282 by the pressure of the viscous fluid 13 going to flow through the flow path 128a, 128b. And the plug portion 161 of the needle 160 leaves the through-hole 151 of the check valve 15. And thereby the flow path 128a, 128b is opened. As a result, in the cylindrical chamber 111, the restriction of the movement between areas 111a-111d partitioned by the bulkheads 115a, 115b and the vanes 124a, 124b of the rotor 12 is cancelled. And the viscous fluid 13 moves from the areas 111a, 111d to the areas 111b, 111c through the flow paths 128a, 128b. Thus, it is possible to prevent the pressures of the viscous fluid 13 in the areas 111a, 111d from increasing to exceed the predetermined value, while generating strong damping torque.

On the other hand, as shown in FIG. 8, when the rotor 12 rotates in the reverse rotation direction (the direction β in the present embodiment) relatively to the case 11, the check valve 15 slides in the second flow path 1281 up to the boundary 1287 between the first flow path section 1280 and the second flow path section 1281.

Here, since the movement of the needle 160 toward the second flow path section 1281 is limited by the stopper 163, the plug portion 161 of the needle 160 is not pushed in the through-hole 151 of the check valve 15. And thereby the flow path 128a, 128b is opened. Accordingly, the viscous fluid 13 moves from the area 111b, 111c to the area 111a, 111d through the flow path 128a, 128b. Thus, the pressures of the viscous fluid 13 in the areas 111b, 111c are not increased. And thereby weak damping torque is generated.

Hereinabove, the first embodiment of the present invention has been described.

In the present embodiment, the rotary damper 1 generates strong damping torque against the rotating force of the normal rotation direction applied to the rotor 12 or the case 11, by limiting the movement of the viscous fluid 13 filling the inside of the cylindrical chamber 111 through the flow paths 128a, 128b. And the rotary damper 1 is provided with the pressure-regulating valves 16 which cancel the limitation of the movement of the viscous fluid 13 from the high-pressure side to the low-pressure side when the rotating force exceeds the predetermined value. Thus, according to the present embodiment, even if the rotating force exceeding the assumed value is applied to the rotor 12 or the case 11, the pressure of the viscous fluid 13 filling the inside of the cylindrical chamber 111 can be kept below the predetermined value, reducing the possibility that the rotary damper 1 is damaged.

Further, in the present embodiment, the vane 124a of the rotor 12 is provided with the flow path 128a which connects the areas 111a, 111b partitioned by the bulkheads 115a, 115b of the cylindrical chamber 111 and this vane 124a. Further, the vane 124b of the rotor 12 is provided with the flow path 128b which connects the areas 111c, 111d partitioned by the bulkheads 115a, 115b of the cylindrical chamber 111 and this vane 124b. Since the check valve 15 and the pressure-regulating valve 16 have the above-described construction, each of the flow paths 128a, 128b have the check valve 15 and the pressure-regulating valve 16 as a pair in its inside. Thus, according to the present embodiment, the check valve 15 and the pressure-regulating valve 16 are placed in the common flow path 128a, 128b not in respective different flow paths, making it possible to reduce the size of the rotary damper 1.

In the present embodiment, the flow path 128a, 128b is formed in the vane 124a, 124b of the rotor 12. And the check valve 15 and the pressure-regulating valve 16 are provided as a pair in each of the flow paths 128a, 128b. The present invention, however, is not limited to this. For example, it is possible to form the flow paths 128a, 128b in the bulkheads 115a, 115b of the cylindrical chamber 111 of the case 11. And it is possible to provide the check valve 15 and the pressure-regulating valve 16 as a pair in the flow path 128a, 128b.

[Second Embodiment]

Figure 9:
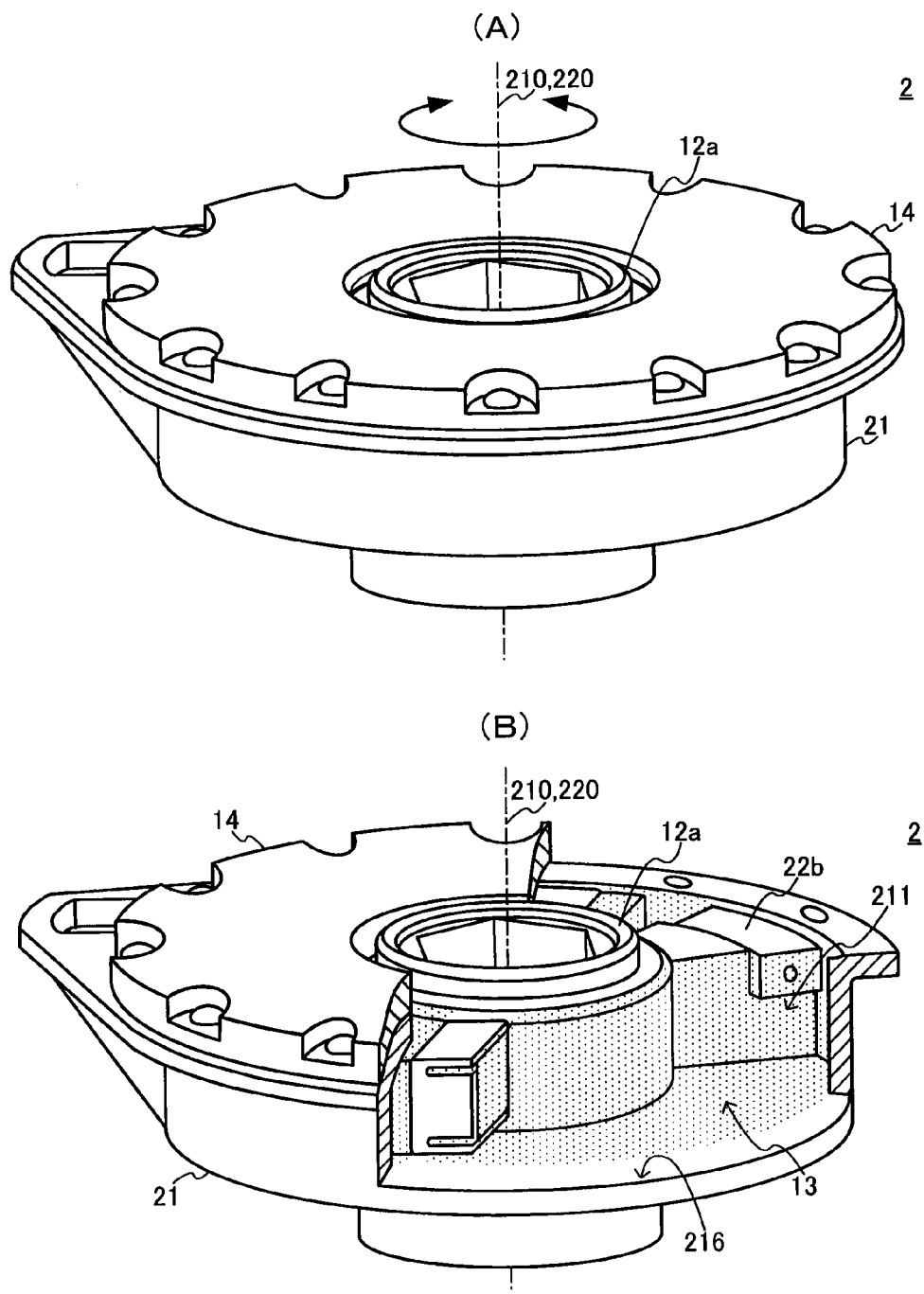
FIGS. 9(A) and 9(B) are an external view and a partial cross-section showing a schematic construction of the rotary damper 2 of the second embodiment of the present invention.
Figure 10:
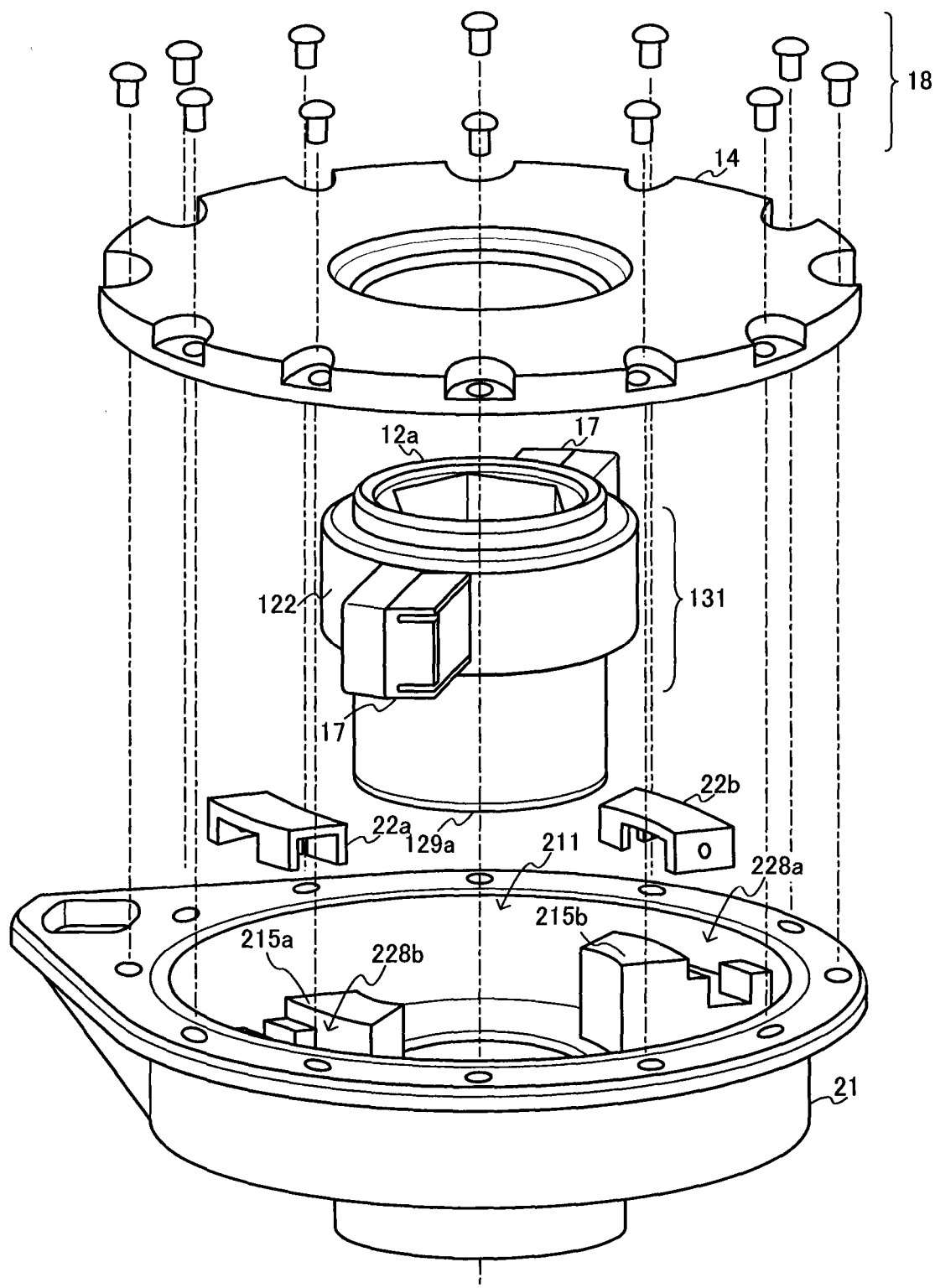
FIG. 10 is an exploded view of the rotary damper 2.

FIGS. 9(A) and 9(B) are an external view and a partial cross-section showing a schematic construction of the rotary damper 2 according to the second embodiment of the present invention. And FIG. 10 is an exploded view of the rotary damper 2.

As shown in the figures, the rotary damper 2 of the present embodiment comprises: the case 21; the rotor (the rotating body) 12a housed in the case 21 so as to be rotatable relatively to the case 21; the viscous fluid 13 filling the case 21; the lid 14 for enclosing the rotor 12a together with the viscous fluid 13 in the case 21; the pair of backflow prevention mechanisms 22a, 22b each of which has the pressure-regulating function; and the plurality of screws 18 for fixing the lid 14 to the case 21.

Here, the viscous fluid 13, the screws 18 and the lid 14 are similar to those used in the rotary damper 1 of the first embodiment. Further, the construction of the rotor 12a is similar to that of the rotor 12 used in the rotary damper 1 of the first embodiment except that the flow paths 128a, 128b are not formed in the vanes 124a, 124b. Accordingly, description of these will be omitted in the following.

Figure 11:
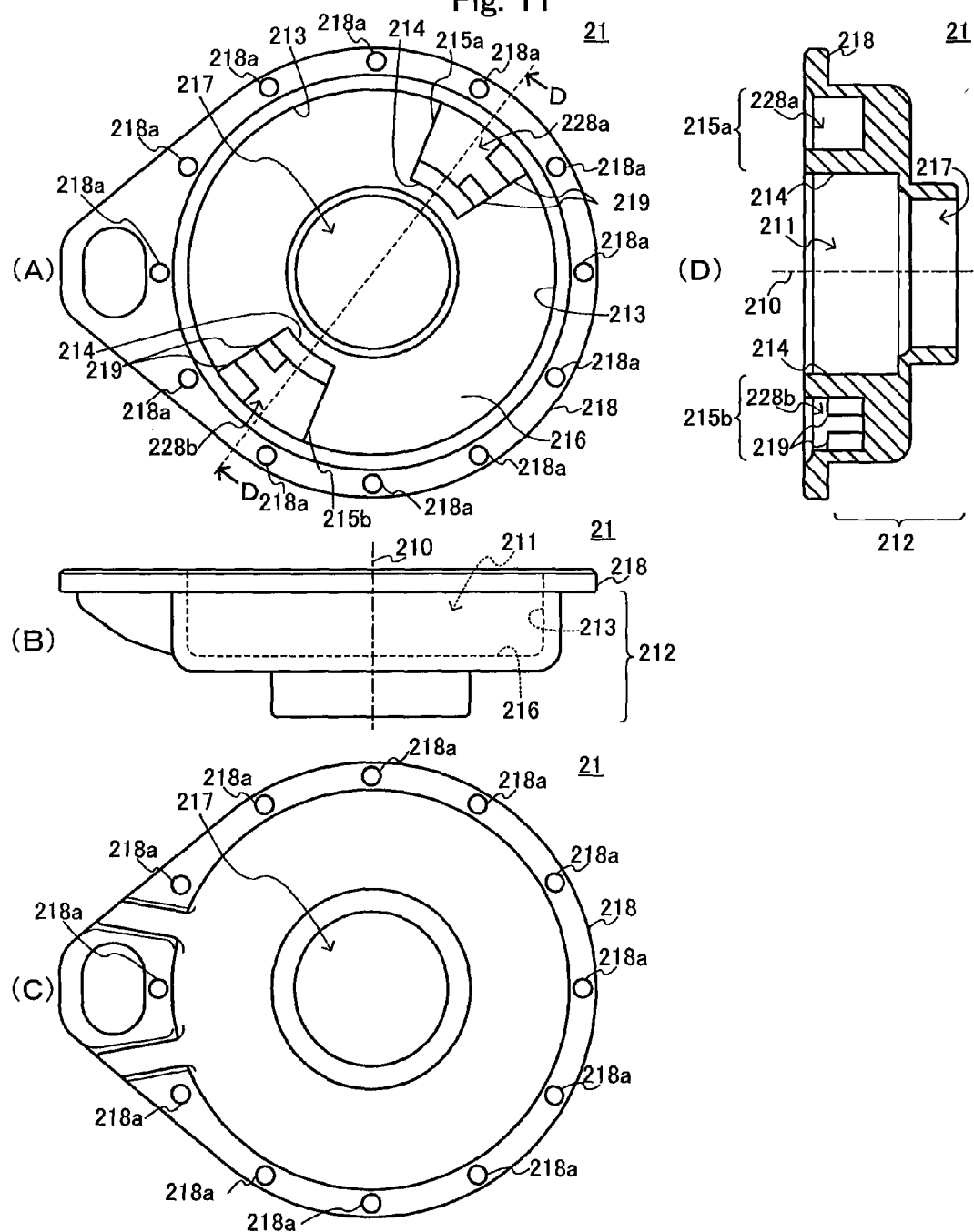
FIGS. 11(A)-11(C) are a top view, a front elevation and a bottom view of the case 21.
FIG. 11(D) is a D-D cross-section of the case 21 shown in FIG. 11(A)

FIGS. 11(A)-11(C) are a top view, a front elevation and a bottom view of the case 21. And FIG. 11(D) is a D-D cross-section of the case 21 shown in FIG. 11(A).

As shown in the figures, the case 21 comprises: the case body 212; and the flange portion 218 formed on the outer periphery of the edge portion of the case body 212.

In the case body 212, the cylindrical chamber (i.e. the cylindrical shape space having the bottom) 211 is formed. The rotor 12a has the rotor body 131 of the cylindrical shape, and the vanes 124a, 124b formed on the outer periphery 122 of the rotor body 131. The rotor 12a is housed in the cylindrical chamber 211 such that the rotor 12a can rotate on the center line 210 of the cylindrical chamber 211 (i.e. such that the center line 210 of the cylindrical chamber 211 coincides with the rotation axis 220 of the rotor 12a). In the bottom surface 216 of the cylindrical chamber 211, the opening 217 for inserting the one end portion (the lower end portion) 129a of the rotor 12a is formed.

Figure 13:
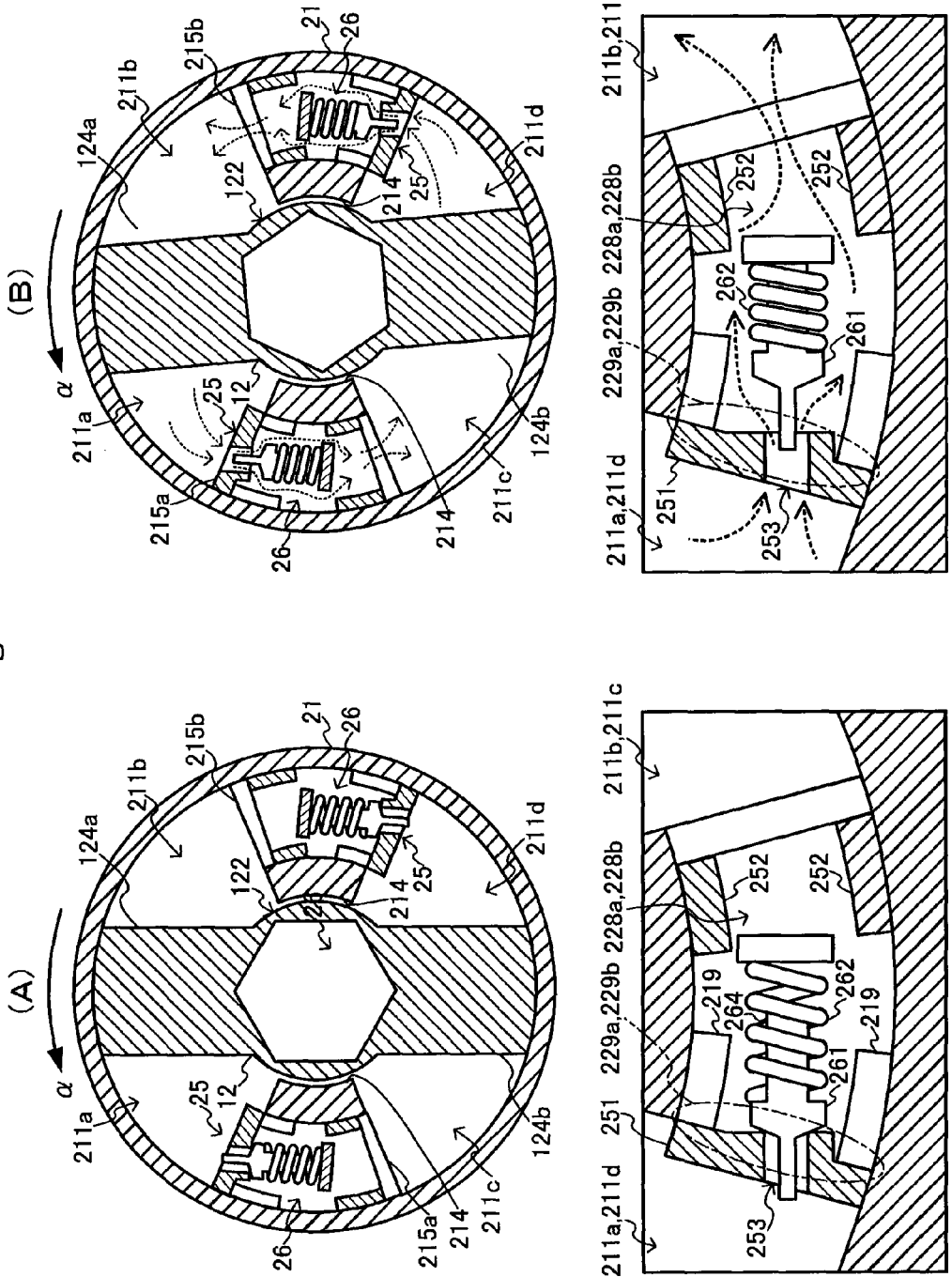
FIGS. 13(A) and 13(B) are views for explaining the operating principle of the rotary damper 2.

On the inner periphery 213 of the case body 212 (i.e. the sidewall surface 213 of the cylindrical chamber 211), the pair of projecting bulkheads 215a, 215b are formed along the center line 210 of the cylindrical chamber 211. The projecting bulkheads 215a, 215b protrude toward the outer periphery 122 of the rotor body 131 (i.e. the apical surfaces 114 of the projecting bulkheads 215a, 215b are close to the outer periphery 122 of the rotor 12), so as to partition in radial directions the ring-shaped space between the outer periphery 122 of the rotor body 131 and the sidewall surface 213 of the cylindrical chamber 211. The viscous fluid 13 fills the areas (the areas 211a-211d in FIG. 13) partitioned by these bulkheads 215a, 215b between the outer periphery 122 of the rotor body 131 and the sidewall surface 213 of the cylindrical chamber 211.

In the bulkhead 215a, the groove-like flow path 228a is formed. The groove-like flow path 228a connects the area 211a (See FIG. 13) in the cylindrical chamber 211 and the area 211c (See FIG. 13) in the cylindrical chamber 211. Here, the area 211a is formed by the bulkhead 215a and the vane 124a of the rotor 12a. And the area 211c is formed by the bulkhead 215a and the vane 124b of the rotor 12a. This flow path 228a houses slidably the backflow prevention mechanism 22a with pressure-regulating function. Similarly, in the bulkhead 215b, the flow path 228b is formed. The flow path 228b connects the area 211d (See FIG. 13) in the cylindrical chamber 211 and the area 211b (See FIG. 13) in the cylindrical chamber 211. Here, the area 211d is formed by the bulkhead 215b and the vane 124b of the rotor 12a. And the area 211b is formed by the bulkhead 215b and the vane 124a of the rotor 12a. This flow path 228b houses slidably the backflow prevention mechanism 22b with pressure-regulating function.

Further, in each of the flow paths 228a, the 228b, the projecting portion 219 is formed. The projecting portion 219 narrows the width of a part of the flow path in the radial direction to limit the sliding range of the backflow prevention mechanism 22a, 22b with pressure-regulating function.

In the flange portion 218, the plurality of threaded holes 218a are formed. And the screws 18 are inserted through through-holes 143a of the lid 14 placed on the flange portion 118, and fastened into these threaded holes 218a.

Figure 12:
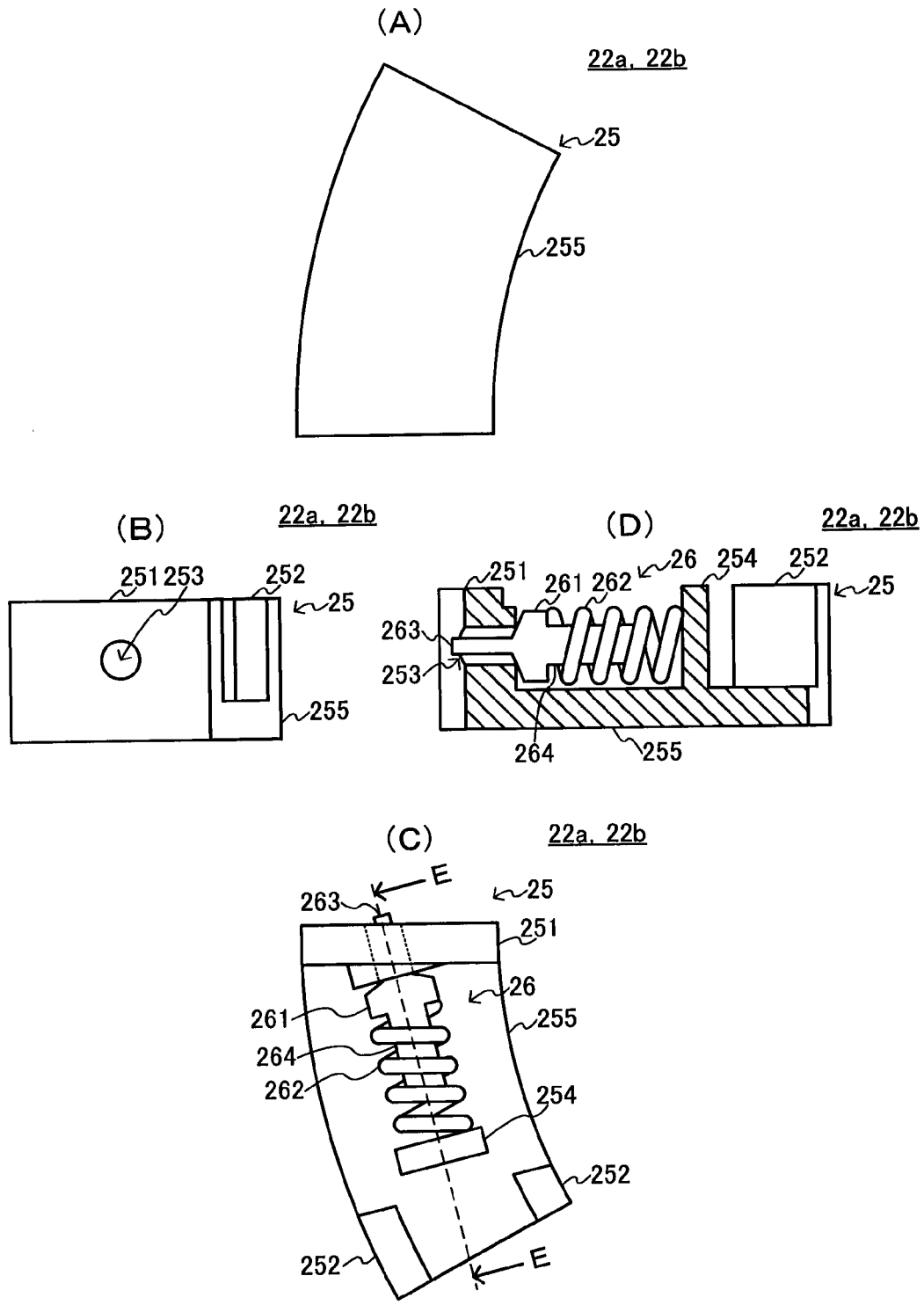
FIGS. 12(A)-12(C) are a top view, a front elevation and a bottom view of the backflow prevention mechanism 22a, 22b with pressure-regulating function.
FIG. 12(D) is an E-E cross-section of the backflow prevention mechanism 22a, 22b with pressure-regulating function shown in FIG. 12(C)

FIGS. 12(A)-12(C) are a top view, a front elevation and a bottom view of the backflow prevention mechanism 22a, 22b with pressure-regulating function. And FIG. 12(D) is an E-E cross-section of the backflow prevention mechanism 22a, 22b with pressure-regulating function shown in FIG. 12(C).

As shown in the figures, the backflow prevention mechanism 22a, 22b has the check valve 25 and the pressure-regulating valve 26.

The check valve 25 comprises: the plate-like valve portion 251 which slides in the circumferential direction to open and close the one flow path opening (i.e. the flow path opening 229a, 229b (See FIG. 13) on the side of the area 211a, 211d in which the filled viscous fluid 13 is pressurized, when the rotor 12a is rotated in the normal rotation direction (the direction α (See FIG. 13) in the present embodiment)); the stoppers 252 which limit the sliding range of the valve portion 251 in cooperation with the projecting portion 219 in the flow path 228a, 228b; the holding portion 254 which holds the pressure-regulating valve 26; and the connecting portion 255 which connects the valve portion 251, the stoppers 252 and the holding portion 254.

Here, in the valve portion 251, the through-hole 253 which is opened and closed by the pressure-regulating valve 26 is formed. Further, the holding portion 254 and the stoppers 252 are formed so as to be located on the side of the area 211b, 211c (See FIG. 13) in which the pressure of the filled viscous fluid 13 is reduced when the rotor 12a is rotated in the normal rotation direction (the direction α (See FIG. 13) in the present invention). Further, the connecting portion 255 has such a length that the valve portion 251 is at a given distance away from the flow path opening 229a, 229b of the flow path 228a, 228b when the rotor 12a rotates in the reverse rotation direction (the direction β (See FIG. 14) in the present embodiment) and the stoppers 252 abut against the projecting portions 219 in the bulkhead 215a, 215b.

The pressure-regulating valve 26 comprises: the needle 264 for regulating the flow rate of the viscous fluid 13 passing through the through-hole 253 of the valve portion 251 of the check valve 25; and the elastic body 262 such as a spring, which is fixed at one end to the holding portion 254 of the check valve 25 and biases at the other end the needle 264 toward the area 211b, 211c. The needle 264 comprises: the tapered plug portion 261 for blocking the through-hole 253 of the valve portion 251 of the check valve 25; and the rod-like guide 263 provided at the end portion of the plug portion 261 on the side of the valve portion 251. The guide 263 is inserted in the through-hole 253 of the valve portion 251 from the side of the area 211b, 211c, and guides the plug portion 261 into the through-hole 253 of the valve portion 251 of the check valve 25. When the needle 264 moves toward the valve portion 251 of the check valve 25 due to biasing by the elastic body 262, then the plug portion 261 is inserted into the through-hole 253 of the valve portion, being guided by the guide 263. As a result, the through-hole 253 of the valve portion 251 of the check valve 25 is blocked by the plug portion 261.

Here, to realize smooth movement of the needle 264, it is possible to provide guides (for example, three or more protrusions formed on the outer end surface portion of the through-hole 253) for preventing play of the guide 263 in the radial direction of the through-hole 253 of the valve portion 251

Next, the operating principle of the rotary damper 2 will be described. FIGS. 13(A) and 13(B) and FIG. 14 are view for explaining the operating principle of the rotary damper 2.

As shown in FIGS. 13(A) and 13(B), when the rotor 12a rotates in the normal rotation direction (the direction α in the present embodiment) relatively to the case 21, the backflow prevention mechanism 22a, 22b with pressure-regulating function slides in the flow path 228a, 228b until the valve portion 251 of the check valve 25 blocks the flow path opening 229a, 229b of the flow path 228a, 228b.

Here, as shown in FIG. 13(A), when the rotating force (the rotating speed in the direction α) applied to the rotor 12a or the case 21 is less than the predetermined value determined by the elastic coefficient of the elastic body 262 of the pressure-regulating valve 26, the plug portion 261 of the needle 264 pressed by the elastic body 262 remains pushed in the through-hole 253 of the valve portion 251. And thereby the flow path 228a, 228b is closed. As a result, in the cylindrical chamber 211, the movement of the viscous fluid 13 between the areas 211a-211d partitioned by the bulkheads 215a, 215b and the vanes 124a, 124b of the rotor 12a is limited to movement through gaps etc. formed between the apical surfaces 214 of the bulkheads 215a, 215b and the outer periphery 122 of the rotor body 131. Accordingly, the pressures of the viscous fluid 13 in the areas 211a, 211d increase to generate strong damping torque.

As shown in FIG. 13(B), when the rotating force applied to the rotor 12a or the case 21 is above the above-mentioned predetermined value, the needle 264 is pushed back owing to the pressure by the viscous fluid 13 going to flow through the flow path 228a, 228b. And, the plug portion 261 of the needle 264 leaves the through-hole 253 of the valve portion 251, to open the flow path 228a, 228b. As a result, in the cylindrical chamber 211, the restriction on the movement of the viscous fluid 13 between the areas 211a-211d partitioned by the bulkheads 215a, 215b and the vanes 124a and 124b of the rotor 12a is canceled, and the viscous fluid 13 moves from the areas 211a, 211d to the areas 211c, 211b through the flow paths 228a, 228b and the through-holes 253 of the plug portions 251. Thus, it is possible to prevent the pressures of the viscous fluid 13 in the areas 211a, 211d from increasing to exceed the predetermined value, while generating strong damping torque.

On the other hand, as shown in FIG. 14, when the rotor 12a rotates in the reverse rotation direction (the direction β in the present embodiment) relatively to the case 21, the backflow prevention mechanism 22a, 22b with pressure-regulating function slides in the flow path 228a, 228b until the stopper 252 of the check valve 25 abuts against the projecting portions 219 in the flow path 228a, 228b. As a result, the valve portion 251 moves up to a position away from the flow path opening 229a, 229b of the flow path 228a, 228b. And thereby the flow path 228a, 228b is opened. Accordingly, the viscous fluid 13 moves from the area 211b, 211c to the area 211a, 211d through the flow path 228a, 228b. As a result, the pressures of the viscous fluid in the areas 211b, 211c are not increased. And thereby weak damping torque is generated.

Hereinabove, the second embodiment of the present invention has been described.

Also in the present embodiment, similarly to the above-described first embodiment, when the rotating force exceeding the assumed value is applied to the rotor 12a or the case 21, the pressure on the viscous fluid 13 filling the inside of the cylindrical chamber 211 can be kept below a predetermined value, reducing the possibility that the rotary damper 2 is damaged. Further, since the pressure-regulating valve 26 is incorporated in the check valve 25 to obtain the backflow prevention mechanism 22a, 22b with pressure-regulating function, the check valve 25 and the pressure-regulating valve 26 can be placed in the common flow path 228a, 228b, making it possible to reduce the size of the rotary damper 2.

In the present embodiment, the flow paths 228a, 228b are formed in the bulkheads 215a, 215b of the cylindrical chamber 211, and the backflow prevention mechanisms 22a, 22b with pressure-regulating function are provided in the flow paths 228a, 228b. The present invention, however, is not limited to this. For example, it is possible to form the flow paths 228a, 228b in the vanes 124a, 124b of the rotor 12a, and to provide the backflow prevention mechanisms 22a, 22b with pressure-regulating function in these flow paths 228a, 228b.

[Third Embodiment]

Figure 15:
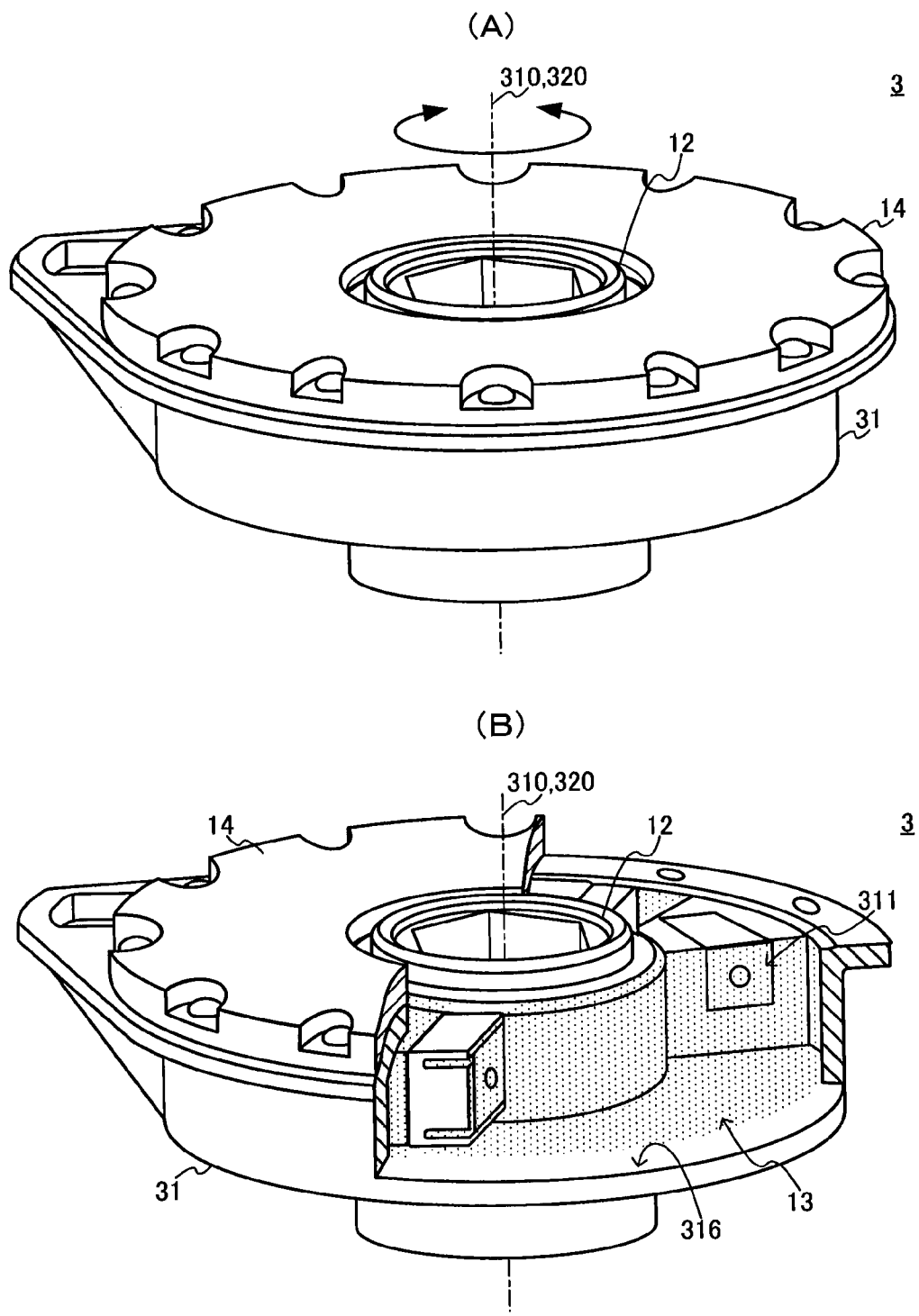
FIGS. 15(A) and 15(B) are an external view and a partial cross-section showing a schematic construction of the rotary damper 3 of the third embodiment of the present invention.
Figure 16:
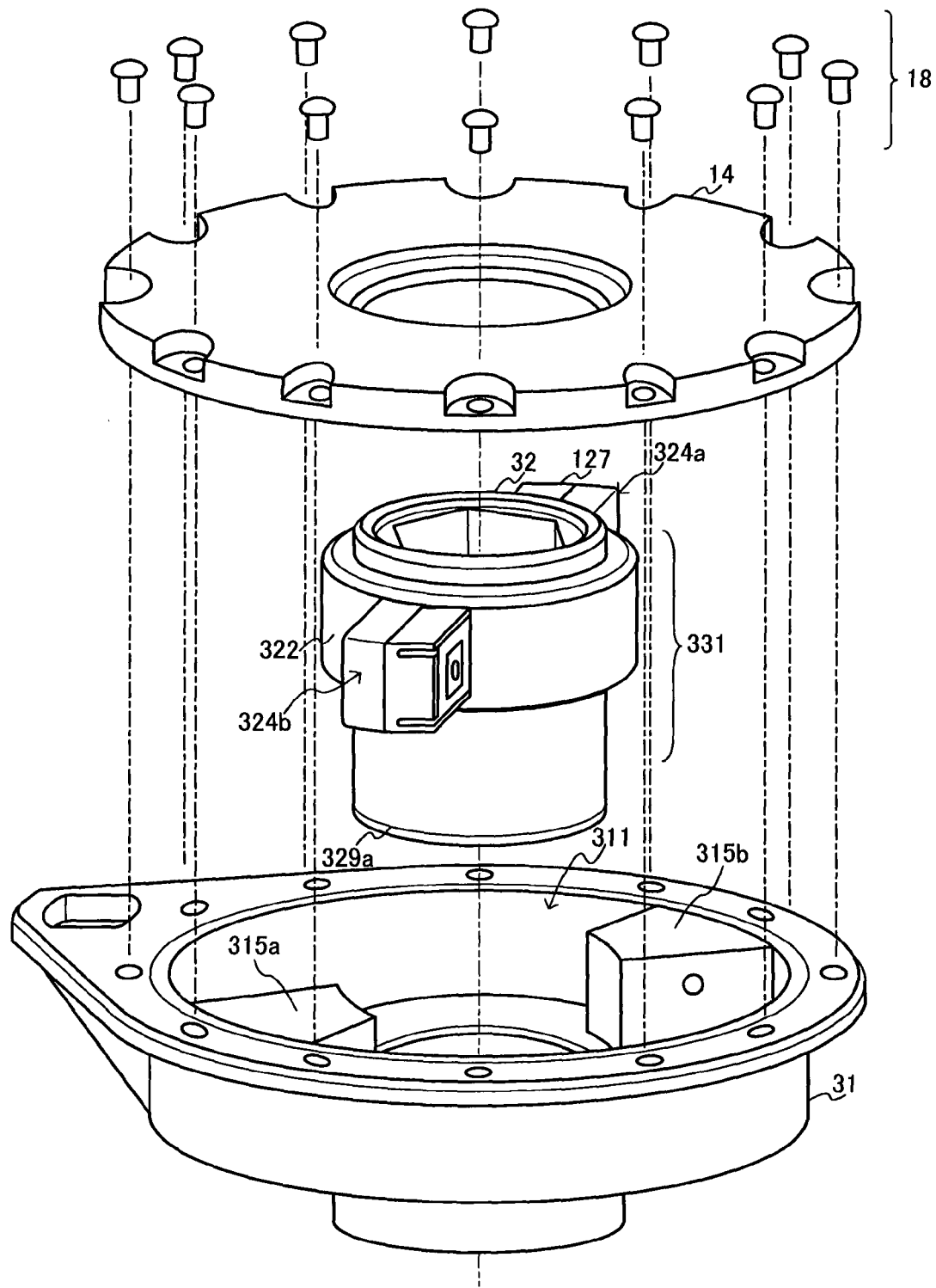
FIG. 16 is an exploded view of the rotary damper 3.

FIGS. 15(A) and 15(B) are external view and a partial cross-section showing a schematic construction of the rotary damper 3 according to the third embodiment of the present invention. And FIG. 16 is an exploded view of the rotary damper 3.

As shown in the figures, the rotary damper 3 of the present embodiment comprises: the case 31; the rotor (the rotating body) 32 housed in the case 31 so as to be rotatable relatively to the case 31; the viscous fluid 13 filling the case 31; the lid 14 for enclosing the rotor 32 together with the viscous fluid 13 in the case 31; and the plurality of screws 18 for fixing the lid 14 to the case 11. Although not shown in FIG. 15, the rotary damper 3 further comprises the check valves 35 and the pressure-regulating valves 36.

Here, the viscous fluid 13, the screws 18 and the lid 14 are similar to those used in the rotary damper 1 of the first embodiment, and thus description of these will be omitted in the following.

Figure 17:
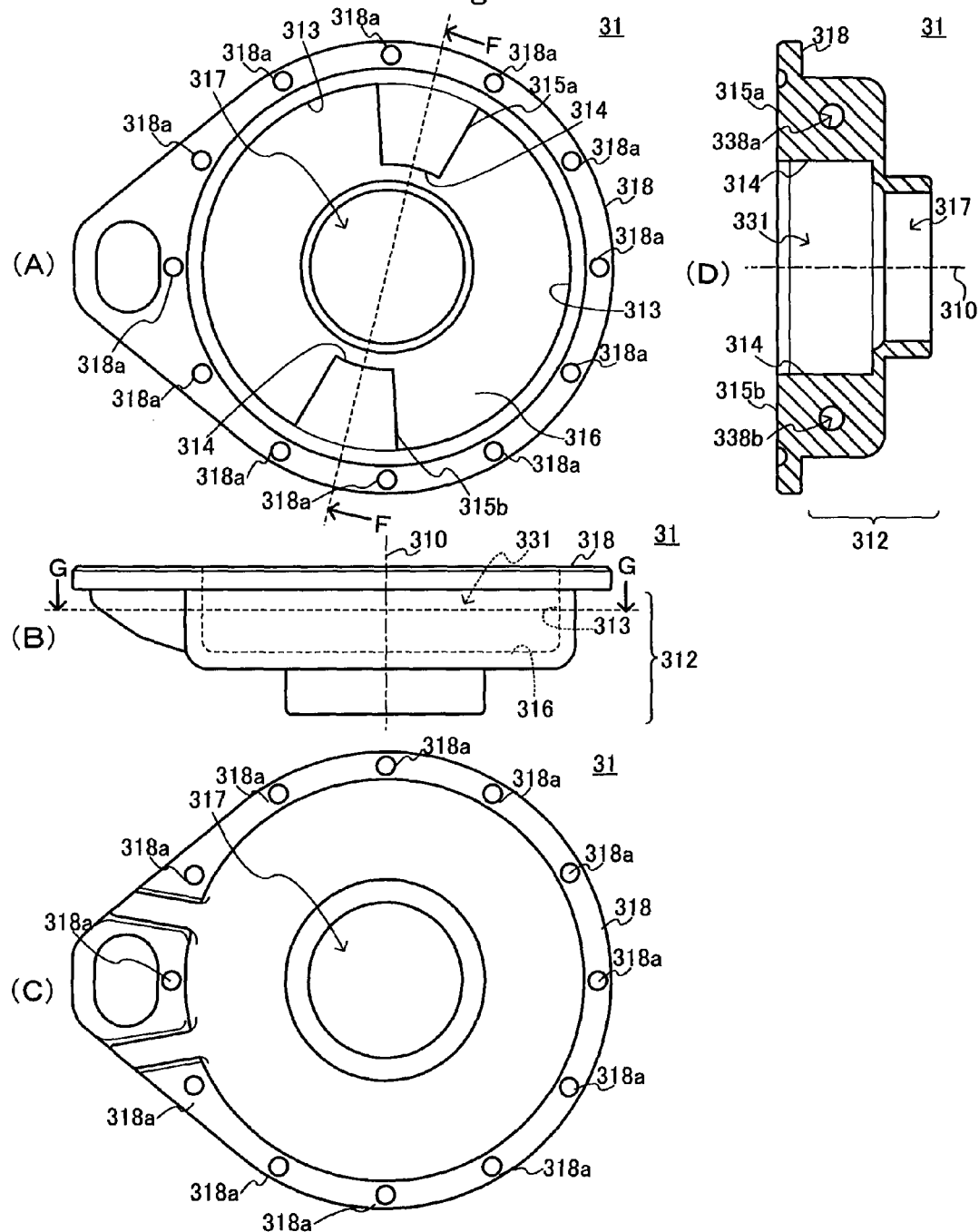
FIGS. 17(A)-17(C) are a top view, a front elevation and a bottom view of the case 31.
FIG. 17(D) is an F-F cross-section of the case 31 shown in FIG. 17(A)

FIGS. 17(A)-17(C) are a top view, a front elevation and a bottom view of the case 31. And FIG. 17(D) is an F-F cross-section of the case 31 shown in FIG. 17(A).

As shown in the figures, the case 31 comprises: the case body 312; and the flange portion 318 formed on the outer periphery of the edge portion of the case body 312.

In the case body 312, the cylindrical chamber (i.e. the space of the cylindrical shape having the bottom) 311 is formed. The rotor 32 has the rotor body 331 of the cylindrical shape and the vanes 324a, 324b formed on the outer periphery 322 of the rotor body 331. The rotor 32 is housed in the cylindrical chamber 311 such that the rotor 32 can rotate on the center line 310 of the cylindrical chamber 311 (i.e. such that the center line 310 of the cylindrical chamber 311 coincides with the rotation axis 320 of the rotor 32). On the inner periphery 313 of the case body 312 (i.e. the sidewall surface 313 of the cylindrical chamber 311), the pair of projecting bulkheads 315a, 315b are formed along the center line 310 of the cylindrical chamber 311. The projecting bulkheads 315a, 315b protrude toward the outer periphery 322 of the rotor body 331 (i.e. the apical surfaces 314 of the projecting bulkheads 315a, 315b are close to the side surface 322 of the rotor 32), so as to partition in radial directions the ring-shaped space between the outer periphery 322 of the rotor body 331 and the sidewall surface 313 of the cylindrical chamber 311. The viscous fluid 13 fills the areas (the areas 311a-311d in FIG. 22) partitioned by these bulkheads 315a, 315b between the outer periphery 322 of the rotor body 331 and the sidewall surface 313 of the cylindrical chamber 311. In the bottom surface 316 of the cylindrical chamber 311, the opening 317 for inserting one end portion (the lower end portion) 329a of the rotor body 331 is formed.

Further, in the bulkhead 315a, the flow path (the orifice) 338a for check valve is formed. The flow path 338a connects the area 311a (See FIG. 22) and the area 311c (See FIG. 22). The area 311a is formed by this bulkhead 315a and the vane 324a of the rotor 32 in the cylindrical chamber 311. And the area 311c (See FIG. 22) is formed by this bulkhead 315a and the vane 324b of the rotor 32 in the cylindrical chamber 311. Similarly, in the other bulkhead 315b, the flow path (the orifice) 338b for check valve is formed. The flow path 338b connects the area 311b (See FIG. 22) and the area 311d (See FIG. 22). The area 311b is formed by this bulkhead 315b and the vane 324a of the rotor 32 in the cylindrical chamber 311. And the area 311d (See FIG. 22) is formed by this bulkhead 315b and the vane 324b of the rotor 32 in the cylindrical chamber 311.

FIG. 18(A) is a G-G cross-section of the case 31 shown in FIG. 17(B). And FIG. 18(B) is an enlarged view of the portion H of FIG. 18(A).

As shown in the figures, the spherical check valve 35 is provided in the inside of each of the flow paths 338a, 338b for check valve.

In each of the flow paths 338a, 338b for check valve, the first flow path section 3381 for check valve and the second flow path section 3382 for check valve are formed. The second flow path section 3382 for check valve has a flow path cross-section size in the radial direction larger than that of the first flow path section 3381 for check valve. The second flow path section 3382 for check valve has a diameter larger than that of the check valve 35. The second flow path section 3382 houses the check valve 35 slidably so that the check valve 35 opens and closes the first flow path section 3381 for check valve. Further, in the second flow path section 3382 for check valve, the stopper 3383 for limiting the sliding range of the check valve 35 is formed. The first flow path section 3381 for check valve is formed so as to be adjacent to the side of the area 311b, 311c in which the pressure of the filled viscous fluid 13 is reduced when the rotor 32 is rotated in the normal rotation direction (the direction α in the present embodiment, See FIG. 22).

FIGS. 19(A)-19(D) are a top view, a front elevation, a side elevation and a bottom view of the rotor 32.

As shown in the figures, in the rotor body 331, the through-hole 321 centering on the rotation axis 320 is formed. The through-hole 321 inserts a shaft (not shown) that transmits the rotating force from the outside to the rotor 32. The lower end portion 329a of the rotor body 331 (the through-hole 321) is slidably inserted into the opening 317 formed in the bottom surface 316 of the cylindrical chamber 311 of the case 31. And the upper end portion 329b of the rotor body 331 (the through-hole 321) is slidably inserted into the opening 141 of the lid 14. Also, seal members such as O-rings may be interposed between the end portions 329a, 329b of the rotor body 331 and the openings 317, 141 to increase the sealing performance, so that the viscous fluid 13 will not leak out of the cylindrical chamber 311.

Further, on the outer periphery 322 of the rotor body 331, the pair of vanes (rotating wings) 324a, 324b are formed along the rotation axis 320 of the rotor 32. The vanes 324a, 324b protrude toward the sidewall surface 313 of the cylindrical chamber 311 such that apical surfaces (i.e. the surfaces corresponding to the side wall surface 313 of the cylindrical chamber 311) 323 of the vanes 324a, 324b are close to the sidewall surface 313 of the cylindrical chamber 311. The lip seal 327 (See FIG. 15) is attached to each of the vanes 324a, 324b. The lip seal 327 fills gaps formed between the apical surface 323 of the vane 324a, 324b and the sidewall surface 313 of the cylindrical chamber 311, and gaps formed between the lower surface (the surface corresponding to the bottom surface 316 of the cylindrical chamber 311) 325 of the vane 324a, 324b and the bottom surface 316 of the cylindrical chamber 311. And also the lip seal 327 fills gaps formed between the upper surface (the surface on the side of the lid 14) 326 of the vane 324a, 324b and the lower surface 142 of the lid 14.

Figure 19:
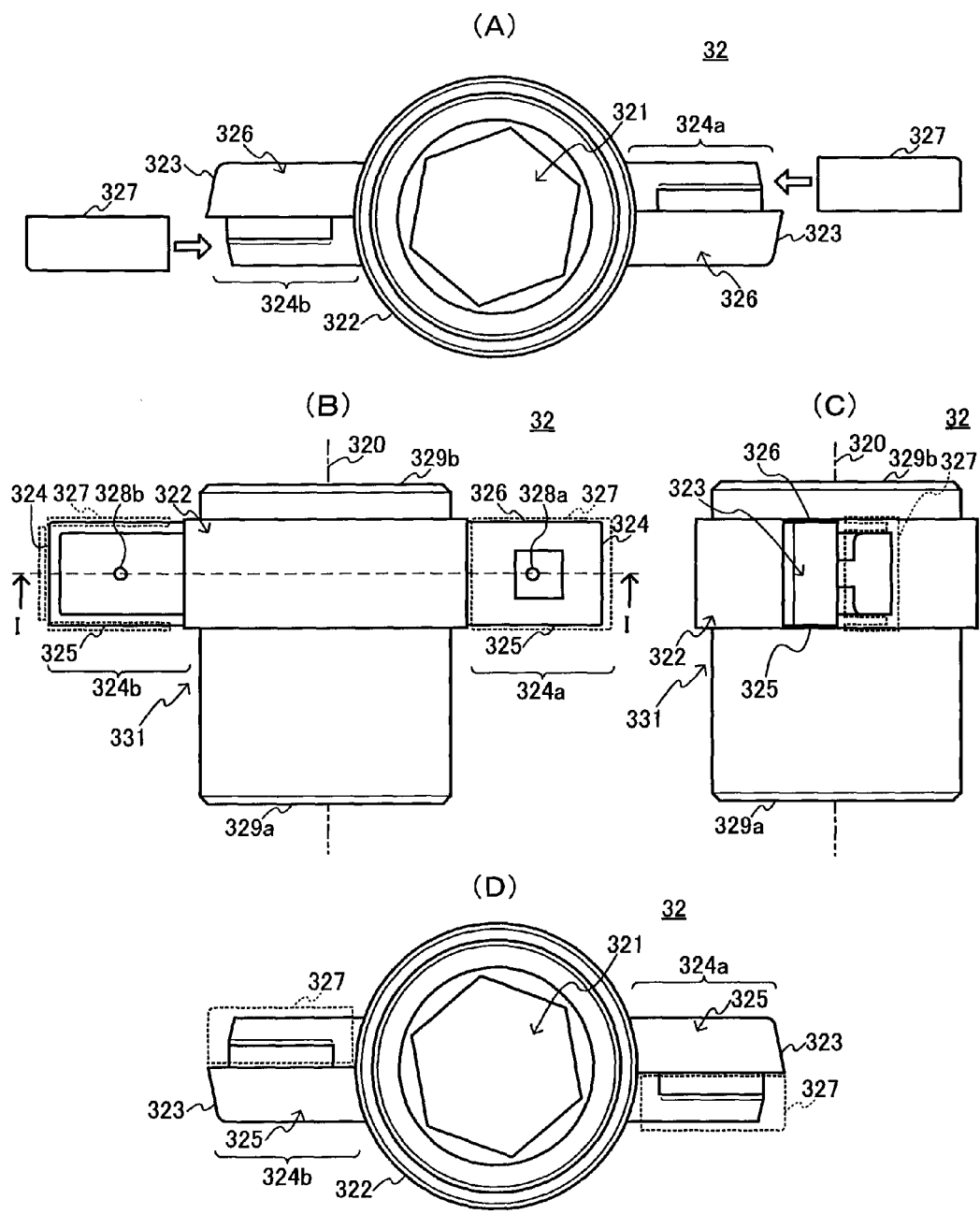
FIGS. 19(A)-19(D) are a top view, a front elevation, a side elevation and a bottom view of the rotor 32.
Figure 20:
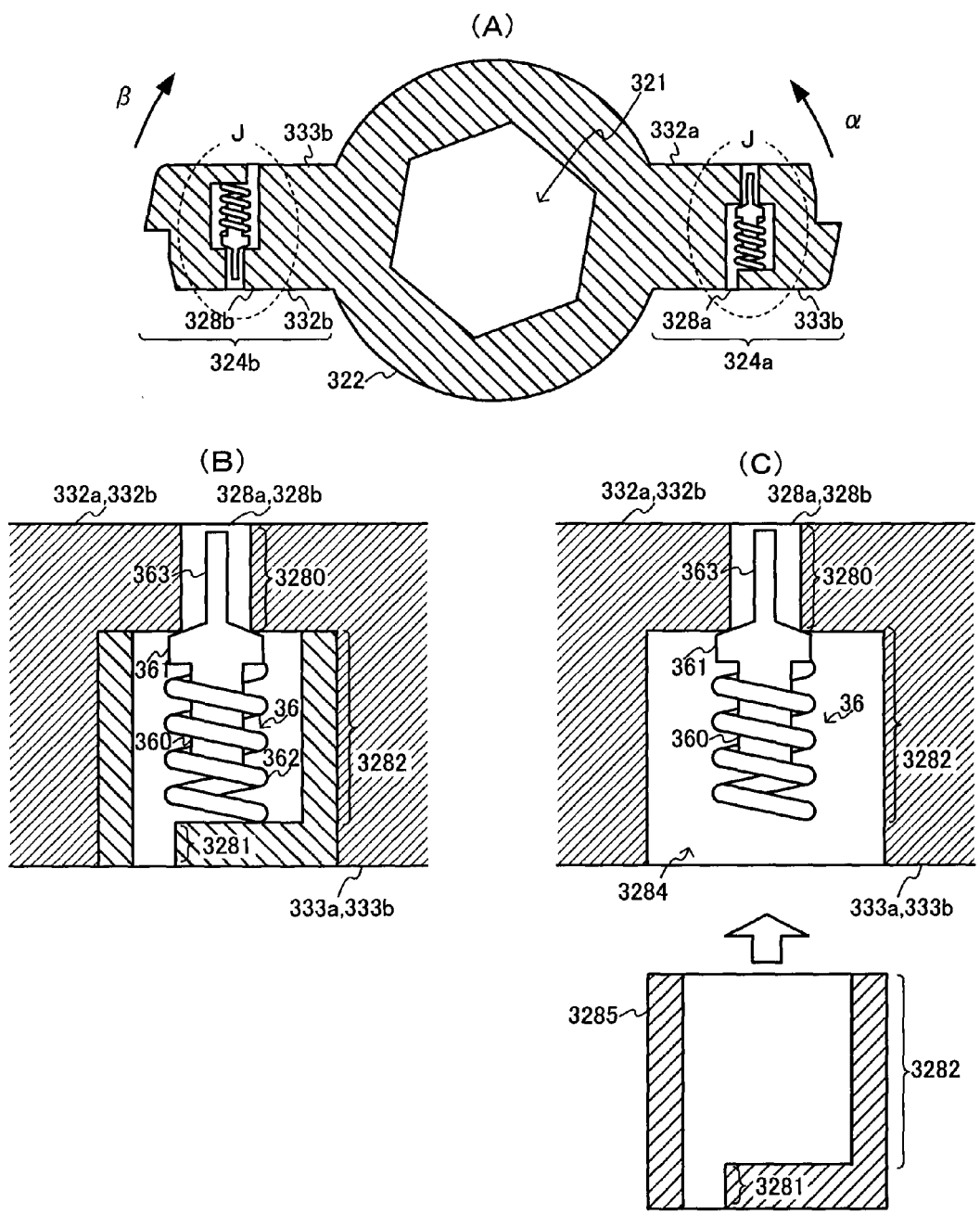
FIG. 20(A) is an I-I cross-section of the rotor 32 shown in FIG. 19(B)
FIG. 20(B) is an enlarged view of the portion J of FIG. 20(A)
FIG. 20(C) is a view for explaining a method of the preparing flow paths 328a, 328b.

FIG. 20(A) is an I-I cross-section of the rotor 32 shown in FIG. 19(B). FIG. 20(B) is an enlarged view of the portion J of FIG. 20(A). And FIG. 20(C) is a view for explaining a method of preparing the flow paths 328a, 328b.

In one vane 324a, the flow path (the orifice) 328a for pressure-regulating valve is formed. The flow path 328a for pressure-regulating valve connects the area 311a (See FIG. 22) in the cylindrical chamber 311 and the area 311b (See FIG. 22) in the cylindrical chamber 311. The area 311a is formed by the vane 324a and the bulkhead 315a of the cylindrical chamber 311. And the area 311b is formed by the vane 324a and the bulkhead 315b of the cylindrical chamber 311. Similarly, in the other vane 324b, the flow path (the orifice) 328b for pressure-regulating valve is formed. The flow path 328b for pressure-regulating valve connects the area 311c (See FIG. 22) in the cylindrical chamber 311 and the area 311d (See FIG. 22) in the cylindrical chamber 311. The area 311c is formed by the vane 324b and the bulkhead 315a of the cylindrical chamber 311. And the area 311d is formed by the vane 324b and the bulkhead 315b of the cylindrical chamber 311.

In each of the flow paths 328a, 328b for pressure-regulating valve, the flow path section 3282 for pressure-regulating valve is formed between the flow path opening 3280 formed in the one side surface 332a, 332b of the vane 324a, 324b and the flow path opening 3281 formed in the other side surface 333a, 333b of the vane 324a, 324b. The flow path section 3282 for pressure-regulating valve has a flow path cross-section size in the radial direction larger than those of the flow path openings 3280, 3281. And the axis of the flow path section 3282 for pressure-regulating valve is shifted from the axes of the flow path openings 3280, 3281. The flow path section 3282 for pressure-regulating valve houses the pressure-regulating valve 36.

The pressure-regulating valve 36 comprises: the needle 360 for regulating the flow rate of the viscous fluid 13 passing through the flow path opening 3280 of the flow path 328a, 328b for pressure-regulating valve; and the elastic body 362 such as a spring, which presses the needle 360 toward the flow path opening 3280 of the flow path 328a, 328b for pressure-regulating valve. Here, the flow path opening 3280 of the flow path 328a, 328b for pressure-regulating valve is the flow path opening facing the area 311a, 311b (See FIG. 22). The filled viscous fluid 13 in the area 311a, 311b is pressurized when the rotor 32 is rotated in the normal rotation direction (the direction α in the present embodiment).

The needle 360 comprises: the tapered plug portion 361 for blocking the flow path opening 3280 of the flow path 328a, 328b for pressure-regulating valve; and the guide 363 provided at the tip of the plug portion 361. The guide 363 is inserted in the flow path opening 3280 of the flow path 328a, 328b for pressure-regulating valve from the side of the area 311b, 311c, and guides the plug portion 361 into the flow path opening 3280 of the flow path 328a, 328b for pressure-regulating valve. When the needle 360 moves toward the flow path opening 3280 of the flow path 328a, 328b for pressure-regulating valve due to biasing by the elastic body 362, the plug portion 361 is guided by the guide 363, and is inserted into the flow path opening 3280 of the flow path 328a, 328b for pressure-regulating valve. As a result, the flow path opening 3280 of the flow path 328a, 328b for pressure-regulating valve is blocked by the plug portion 361.

For example, as shown in FIG. 20(C), the flow path 328a, 328b for pressure-regulating valve can be prepared by: previously forming the through-hole 3284 as a part (i.e. the flow path opening 3280 and the flow path section 3282 for pressure-regulating valve) of the flow path 328a, 328b for pressure-regulating valve in the vane 324a, 324b; inserting the pressure-regulating valve 36 into the through-hole 3284; and then fitting in the block 3285 in which a part (i.e. the other flow path opening 3281) of the flow path 328a, 328b for pressure-regulating valve is formed.

Here, to realize smooth movement of the needle 360, it is possible to provides guides (for example, three or more protrusions formed on the end surface portion of the flow path opening 3280 on the side of the flow path section 3282 for pressure-regulating valve) for preventing play of the guide 363 in the radial direction of the flow path opening 3280.

Figure 21:
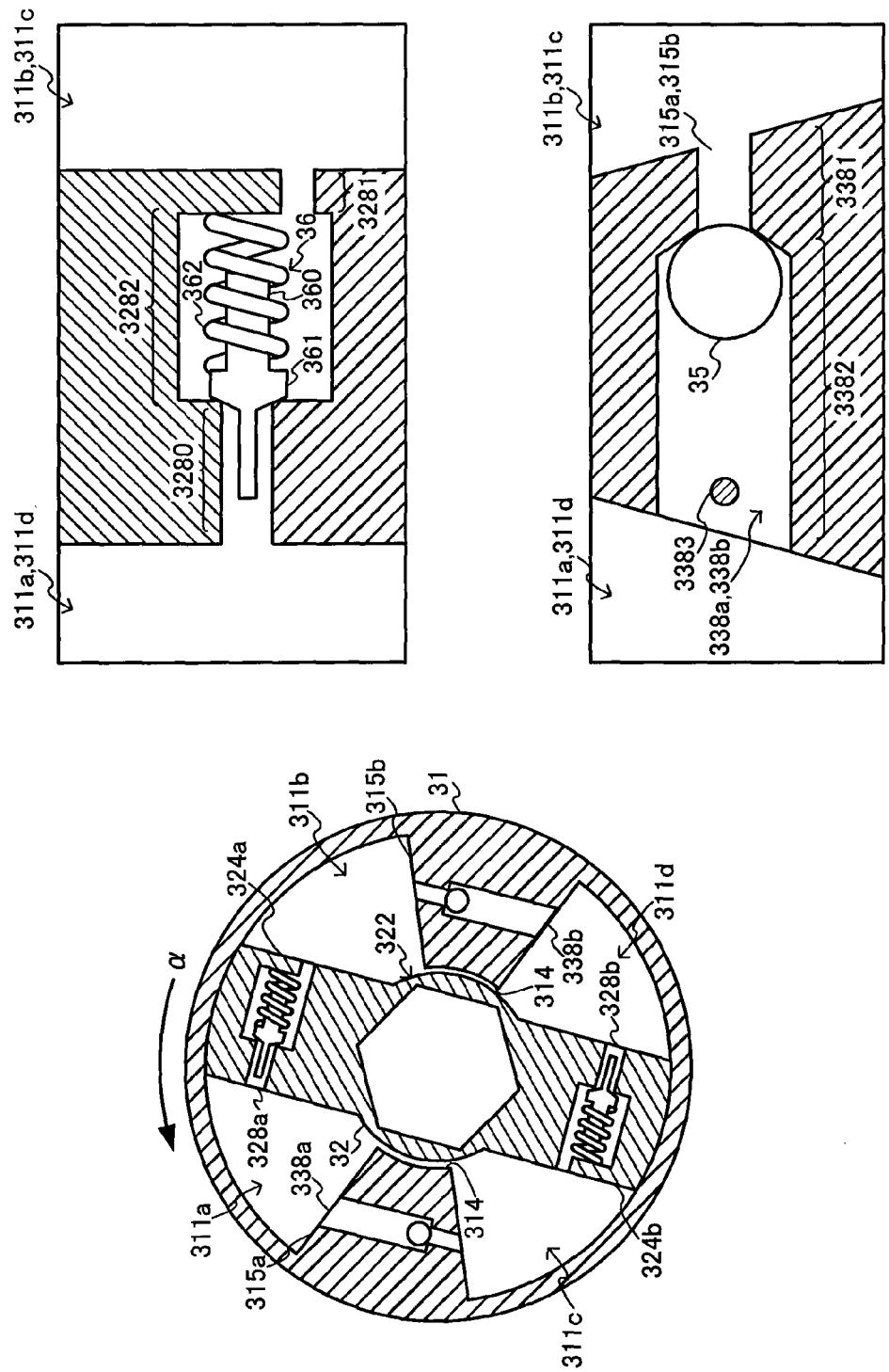
FIG. 21 is a view for explaining the operating principle of the rotary damper 3.
Figure 22:
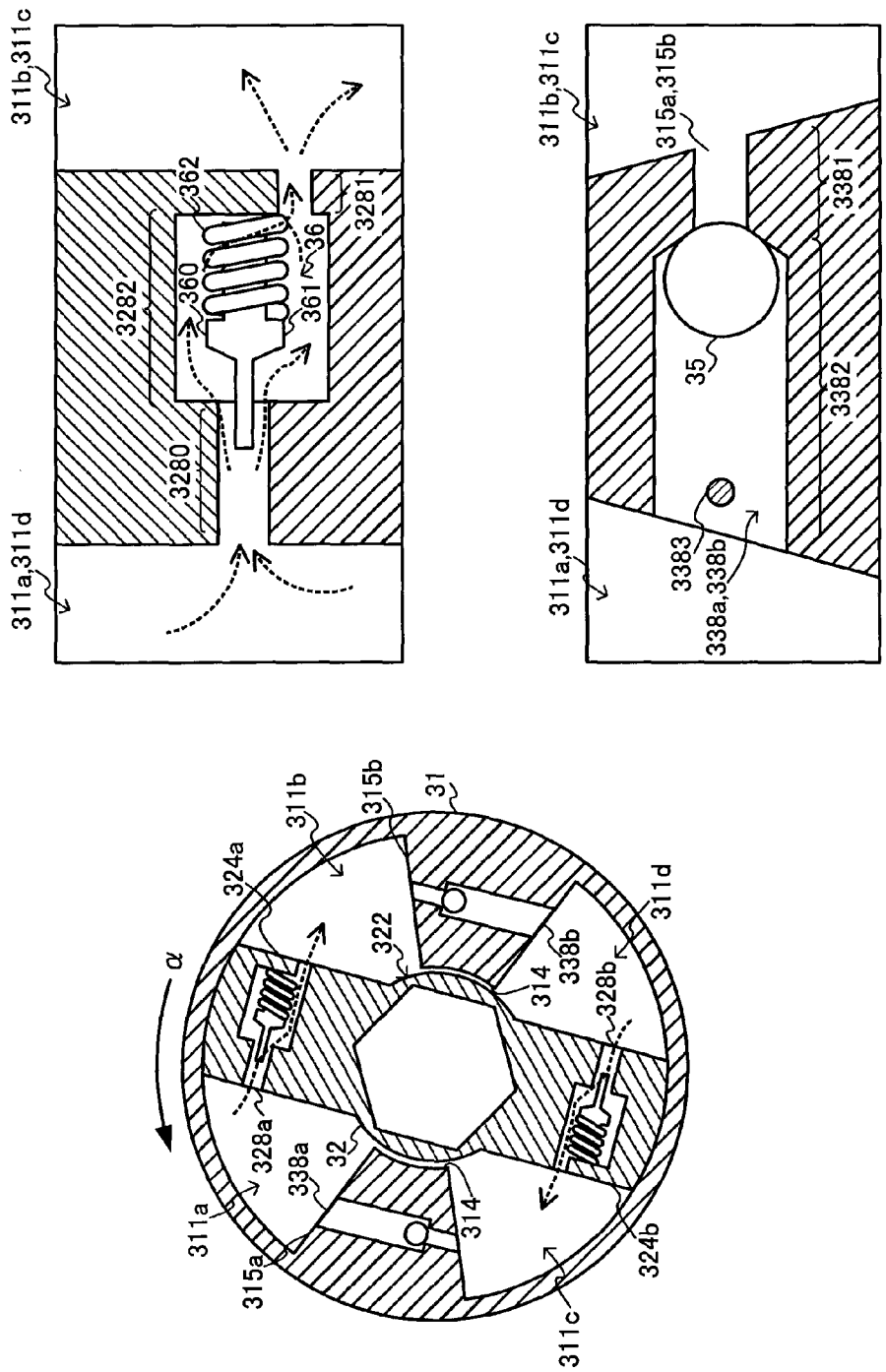
FIG. 22 is a view for explaining the operating principle of the rotary damper 3.
Figure 23:
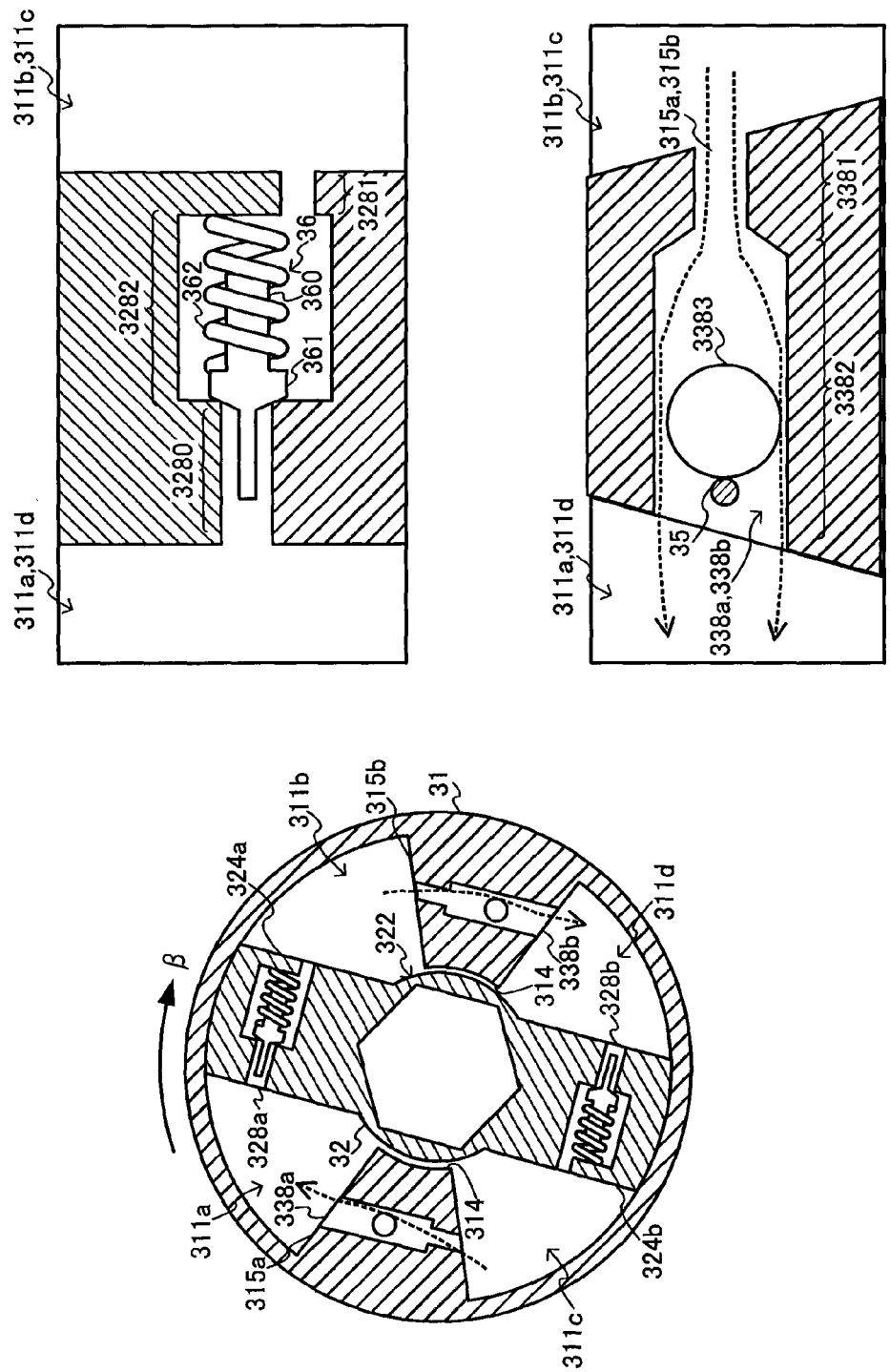
FIG. 23 is a view for explaining the operating principle of the rotary damper 3.

Next, the operating principle of the rotary damper 3 will be described. FIGS. 21-23 are views for explaining the operating principle of the rotary damper 3.

As shown in FIGS. 21 and 22, when the rotor 32 rotates in the normal rotation direction (the direction α in the present embodiment) relatively to the case 31, the check valve 35 slides in the second flow path section 3382 for check valve up to the boundary between the first flow path section 3381 for check valve and the second flow path section 3382 for check valve. And thereby the check valve 35 blocks the first flow path section 3381 for check valve. As a result, the flow path 338a, 338b for check valve is closed.

Here, as shown in FIG. 21, when the rotating force (the rotating speed in the direction α) applied to the rotor 32 or the case 31 is less than a predetermined value determined by the elastic coefficient of the elastic body 362 of the pressure-regulating valve 36, the plug portion 361 of the needle 360 pressed by the elastic body 362 remains pushed in the flow path opening 3280 of the flow path 328a, 328b for pressure-regulating valve. And thereby the flow path 328a, 328b for pressure-regulating valve is closed. As a result, in the cylindrical chamber 311, the movement of the viscous fluid 13 between the areas 311a-311d partitioned by the bulkheads 315a, 315b and the vanes 324a, 324b of the rotor 32 is limited to movement through gaps etc. formed between the apical surfaces 314 of the bulkheads 315a, 315b and the outer periphery 322 of the rotor body 331. Accordingly, the pressures of the viscous fluid 13 in the areas 311a, 311d are increased. And thereby strong damping torque is generated.

As shown in FIG. 22, when the rotating force applied to the rotor 32 or the case 31 is above the above-mentioned predetermined value, the needle 360 is pushed back due to the pressure by the viscous fluid 13 going to flow through the flow path 328a, 328b for pressure-regulating valve. And the plug portion 361 of the needle 360 leaves the first flow path section 3281 for pressure-regulating valve. And thereby the flow path 328a, 328b for pressure-regulating valve is opened. As a result, the restriction of the movement of the viscous fluid 13 through the flow paths 328a and 328b for pressure-regulating valve is cancelled. And the viscous fluid 13 moves from the areas 311a, 311d to the areas 311b, 311c through the flow paths 328a, 328b for pressure-regulating valve. Thus, it is possible to prevent the pressure of the viscous fluid 13 in the areas 311a, 311d from increasing to exceed the predetermined value, while generating strong damping torque.

On the other hand, as shown in FIG. 23, when the rotor 32 rotates in the reverse rotation direction (the direction β in the present embodiment) relatively to the case 31, the check valve 35 slides toward the side of the area 311a, 311d in the second flow path section 3382 for check valve until the check valve 35 abuts against the stopper 3383. As a result, the check valve 35 leaves the first flow path section 3381 for check valve. And thereby the flow path 338a, 338b for check valve is opened. Accordingly, the viscous fluid 13 moves from the area 311b, 311c to the area 311a, 311d through the flow path 338a, 338b for check valve. Thus, the pressures of the viscous fluid 13 in the areas 311b, 311c are not increased. And thereby weak damping torque is generated.

Hereinabove, the third embodiment of the present invention has been described.

Also in the present embodiment, similarly to the above-described first and second embodiments, when the rotating force exceeding the assumed value is applied to the rotor 32, the pressure of the viscous fluid 13 filling the inside of the cylindrical chamber 311 can be kept below a predetermined value, reducing the possibility that the rotary damper is damaged. Further, the flow path 328a, 328b provided with the pressure-regulating valve 36 in the inside is formed in the vane 324a, 324b of the rotor 32, and the flow path 338a, 338b provided with the check valve 35 in the inside is formed in the bulkhead 315a, 315b of the cylindrical chamber 311. Thus, it is possible to reduce the size of the rotary damper 3 in comparison with the case where these flow paths are formed together in either the vanes 324a, 324b or the bulkheads 315a, 315b.

In the present embodiment, the flow paths 328a, 328b for the check valves 35 are formed in the bulkheads 315a, 315b of the cylindrical chamber 311, and the flow paths 328a, 328b for the pressure-regulating valve 36 are formed in the vanes 324a, 324b of the rotor 32. However, the present invention is not limited to this. For example, it is possible that the flow paths for the pressure-regulating valves 36 are formed in the bulkheads 315a, 315b of the cylindrical chamber 311, and the flow paths for the check valves 35 are formed in the vanes 324a, 324b of the rotor 32. Or, in the case where requirement for downsizing of the rotary damper 3 is not rigid, these flow paths may be formed together in either the vanes 324a, 324b or the bulkheads 315a, 315b.

Further, in the present embodiment, it is possible to give a function as the check valve to the lip seal 327 attached to the vane 324a, 324b of the rotor 32, to omit the check valve 35 and the flow path 338a, 338b for check valve. More specifically, it is possible to elasticize the apical portion 3271 of the lip seal 327. As shown in FIG. 24(A), the apical portion 3271 is deformed in the direction of blocking the gap 38 between the apical surface 323 of the vane 324a, 324b and the sidewall surface 313 of the cylindrical chamber 311 due to the pressure of the viscous fluid 13 flowing through the gap 38, when the rotor 32 rotates in the normal rotation direction (the direction α in the present embodiment) relatively to the case 31. And as shown in FIG. 24(B), the apical portion 3271 is deformed in the direction of releasing the gap 38 due to the pressure of the viscous fluid 13 flowing through the gap 38, when the rotor 32 rotates in the reverse rotation direction (the direction β in the present embodiment) relatively to the case 31. Thus, it is possible to omit the check valves 35 and the flow paths 338a, 338b for check valves, and thereby the rotary damper 3 can be produced at low cost.

The rotary dampers 1-3 of the above-described embodiments have been described about examples where the pair of bulkheads 115a, 115b, 215a, 215b, 315a, 315b are provided in the cylindrical chamber 111, 211, 311 and the pair of vanes 124a, 124b, 324a, 324b are provided in the rotor 12, 12a, 32. However, the present invention is not limited to this. It is possible to form one bulkhead and one vane, or to form three or more bulkheads and three or more vanes, as long as the number of bulkheads formed in the cylindrical chamber is same as the number of vanes formed in the rotor.

The rotary dampers 1-3 of the above-described embodiments can be widely applied to a seat with a reclining mechanism used, for example, in a car, a railroad vehicle, an airplane, a ship, or the like.

INDUSTRIAL APPLICABILITY

The present invention can be applied to fields where pressure of viscous fluid filling a cylindrical chamber of a rotary damper should be kept less than or equal to a predetermined value as in the case of a seat with reclining mechanism used in a car, a railroad vehicle, an airplane, a ship, or the like.

REFERENCE SIGNS LIST 1-3: rotary damper, 11: case, 12, 12a: rotor (rotating body), 13: viscous fluid, 14: lid, 15: check valve, 16: pressure-regulating valve, 17: lip seal, 18: screw, 21: case, 22a, 22b: backflow prevention mechanism with pressure-regulating function, 25: check valve, 26: pressure-regulating valve, 31: case, 32: rotor (rotating body), 35: check valve, 110:

center line 110 of cylindrical chamber 111, 111: cylindrical chamber, 112: case body, 113: inner periphery of case body 112 (sidewall surface of cylindrical chamber 111), 114: apical surface of bulkhead 115a, 115b, 115a, 115b: bulkhead, 116: bottom surface of cylindrical chamber 111, 117: opening of cylindrical chamber 111, 118: flange portion, 118a: threaded holes of flange portion 118, 120: rotation axis of rotor 12, 121: through-hole of rotor body 131, 122: outer periphery of the rotor body 131, 123: apical surfaces of vane 124a, 124b, 124a, 124b: vane, 125: lower surface of vane 124a, 124b, 126: upper surface of vane 124a, 124b, 127: lip seal, 128a, 128b: flow path (orifice), 129a: lower end portion of rotor body 131, 129b: upper end portion of rotor body 131, 131: rotor body, 132a, 132b: side surface of vane 124a, 124b, 133a, 133b: side surface of vane 124a, 124b, 141: opening of lid 14, 142: lower surface of lid 14, 143a: through-hole of lid 14, 151: through-hole of check valve 15, 160: needle of the pressure-regulating valve 16, 161: plug portion of needle 160, 162: elastic body of pressure-regulating valve 16, 163: stopper of needle 160, 210: center line of cylindrical chamber 211, 211: cylindrical chamber, 212: case body, 213: inner periphery of case body 212 (sidewall surface of cylindrical chamber 211), 214: apical surface of bulkhead 215a, 215b, 215a, 215b: bulkhead, 216: bottom surface of cylindrical chamber 211, 217: opening of cylindrical chamber 211, 218: flange portion, 218a: threaded holes of flange portion 218, 219: projecting portion in flow path 228a, 228b, 228a, 228b: flow path, 229a, 229b: opening of flow path 228a, 228b, 251: valve portion of check valve 25, 252: stopper of check valve 25, 253: through-hole of valve portion 251, 254: holding portion of check valve 25, 255: connecting portion of valve portion 251, 261: plug portion of pressure-regulating valve 26, 262: elastic body of pressure-regulating valve 26, 263: guide of needle 264, 264: needle of pressure-regulating valve 26, 310: center line of cylindrical chamber 311, 311: cylindrical chamber, 313: sidewall surface of cylindrical chamber 311, 314: apical surface of bulkhead 315a, 315b, 315a, 315b: bulkhead, 316: bottom surface of cylindrical chamber 311, 317: opening of cylindrical chamber 311, 320: rotation axis of rotor 32, 321: through-hole of rotor body 331, 322: outer periphery of rotor body 331, 323: apical surface of the vane 324a, 324b, 324a, 324b: vane, 325: lower surface of vane 324a, 324b, 326: upper surface of vane 324a, 324b, 327: lip seal, 328a, 328b: flow path for pressure-regulating valve, 329a: lower end portion of rotor body 331, 329b: upper end portion of rotor body 331, 331: rotor body, 332a, 332b: side surface of vane 324a, 324b, 333a, 333b: side surface of vane 324a, 324b, 338a, 338b: flow path for check valve, 360: needle, 1280: first flow path section, 1281: second flow path section, 1282: third flow path section, 1283: inner wall of flow path 128a, 128b, 1284, 1285: flow path opening of flow path 128a, 128b, 1286: boundary between second flow path section 1281 and third flow path section 1282, 1287: boundary between the first flow path section 1280 and the second flow path section 1281, 1288: through-hole in vane 124a, 124b, 1289: block, 3271: apical portion of lip seal 327, 3280, 3281: flow path opening of flow path for pressure-regulating valve 328a, 328b, 3282: flow path section for pressure-regulating valve, 3284: through-hole of vane 324a, 324b, 3285: block, 3381: first flow path section for the check valve, 3382: second flow path section for the check valve, 3383: stopper of check valve 35

The invention claimed is:

1. A rotary damper for generating damping torque against applied rotating force by restricting movement of filled viscous fluid, comprising:
 a case having a cylindrical chamber filled with the viscous fluid;
 a rotor housed in the cylindrical chamber so as to be rotatable on a center line of the cylindrical chamber relatively to the case;
 a check valve which opens and closes depending on a direction of rotation of the rotor;
 a pressure-regulating valve which opens for canceling the restriction of movement of the viscous fluid, when the rotating force is above a predetermined value;
 a projecting bulkhead which is formed, along the center line of the cylindrical chamber, on a sidewall surface of the cylindrical chamber, such that an apical surface of the bulkhead is close to an outer periphery of the rotor;
 a vane which is formed on the outer periphery of the rotor, such that an apical surface of the vane is close to a side surface of the cylindrical chamber; and
 a flow path which is formed in the vane along the circumferential direction of the rotor, and connects the areas partitioned by the bulkhead and the vane; wherein:
 in the flow path, there are formed a first flow path section for housing the check valve slidably along the circumferential direction of the rotor and a second flow path section for housing the pressure-regulating valve;
 as opposed to the second flow path section, the first flow path section is adjacent to an area in which pressure of the viscous fluid is increased when the rotor is rotated in the normal rotation direction relatively to the case, between the areas partitioned by the bulkhead and the vane;
 the check valve is a plate-like member in which a through-hole is formed; and
 the pressure-regulating valve comprises: a plug portion for the through-hole of the check valve; an elastic body pressing the plug portion toward the first flow path section; and a stopper for limiting movement of the plug portion into the first flow path section;
 when the rotor is rotated in the normal rotation direction relatively to the case, the check valve slides up to an end portion of the first flow path section on a side of the second flow path section, wherein if the rotating force is less than the predetermined value, the plug portion pressed by the elastic body is pushed into the through-hole of the check valve, to close the flow path for restricting movement of the viscous fluid between the areas partitioned by the bulkhead and the vane, and if the rotating force is above the predetermined value, the plug portion is pushed back by pressure of the viscous fluid going to flow the flow path, and leaves the through-hole of the check valve, to open the flow path for allowing movement of the viscous fluid between the areas partitioned by the bulkhead and the vane; and
 when the rotor is rotated in the reverse rotation direction relatively to the case, the check valve slides and leaves the end portion of the first flow path section on the side of the second flow path section, and the plug portion whose movement into the first flow path section is limited by the stopper is not pushed into the through-hole of the check valve, to open the flow path.

2. A rotary damper for generating damping torque against applied rotating force by restricting movement of filled viscous fluid, comprising:

a case having a cylindrical chamber filled with the viscous fluid;

a rotor housed in the cylindrical chamber so as to be rotatable on a center line of the cylindrical chamber relatively to the case;

a check valve which opens and closes depending on a direction of rotation of the rotor;

a pressure-regulating valve which opens for canceling the restriction of movement of the viscous fluid, when the rotating force is above a predetermined value;

a projecting bulkhead which is formed, along the center line of the cylindrical chamber, on a sidewall surface of the cylindrical chamber, such that an apical surface of the bulkhead is close to an outer periphery of the rotor;

a vane which is formed on the outer periphery of the rotor, such that an apical surface of the vane is close to a side surface of the cylindrical chamber; and a flow path which is formed in the bulkhead along the circumferential direction of the rotor, and connects the areas partitioned by the bulkhead and the vane; wherein:

in the flow path, there is formed a projecting portion for narrowing a width of the flow path;

the check valve comprises: a plate-like valve portion, which has a through-hole and is housed slidably along the circumferential direction of the rotor in the flow path within a range limited by the projecting portion; and a housing portion for housing the pressure-regulating valve, which is placed, as opposed to the valve portion, on a side of an area in which pressure of the viscous fluid is reduced when the rotor is rotated in the normal rotation direction relatively to the case, between the areas partitioned by the bulkhead and the vane; and the pressure-regulating valve comprises: a plug portion for the through-hole of the valve portion; and an elastic body for pressing the plug portion into the through-hole of the valve portion;

when the rotor is rotated in the normal rotation direction in relation to the case, the valve portion of the check valve slides to abut against the projecting portion of the flow path, wherein if the rotating force is less than the predetermined value, the plug portion pressed by the elastic body is pushed into the through-hole of the valve portion of the check valve, to close the flow path for restricting movement of the viscous fluid between the areas partitioned by the bulkhead and the vane, and if the rotating force is above the predetermined value, the plug portion is pushed back by pressure of the viscous fluid going to flow the flow path, and leaves the through-hole of the check valve, to open the flow path for allowing movement of the viscous fluid between the areas partitioned by the bulkhead and the vane; and when the rotor is rotated in the reverse rotation direction relatively to the case, the valve portion of the check valve slides and leaves the projecting portion of the flow path, to open the flow path.

* * * * *